US012769466B1

(12) United States Patent
Suchindran et al.

(10) Patent No.: US 12,769,466 B1
(45) Date of Patent: Oct. 20, 2026

(54) MULTI-STORAGE-DEVICE LOGICAL STORAGE POWER MANAGEMENT SYSTEM

(71) Applicant: Dell Products L.P., Round Rock, TX (US)

(72) Inventors: Vaishnavi Suchindran, Bangalore (IN); Ravi Shekhar Singh, Bangalore (IN); Rama Rao Bisa, Bangalore (IN); Raveendra Babu Madala, Agiripalli (IN); Santosh Kumar Sahu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/198,437

(22) Filed: May 5, 2025

(51) Int. Cl.
*G06F 3/06* (2006.01)
*G06F 1/28* (2006.01)

(52) U.S. Cl.
CPC .............. *G06F 3/0625* (2013.01); *G06F 1/28* (2013.01); *G06F 3/0629* (2013.01); *G06F 3/0673* (2013.01)

(58) Field of Classification Search
CPC .... G06F 3/0625; G06F 3/0629; G06F 3/0673; G06F 1/28
USPC .......................................................... 711/154
See application file for complete search history.

(56) References Cited

U.S. PATENT DOCUMENTS

| | | | | |
|---|---|---|---|---|
| 7,849,280 B2 * | 12/2010 | Mizuno | G06F 1/3221 713/324 |
| 9,262,272 B2 | 2/2016 | Akers et al. | |
| 2010/0049917 A1 * | 2/2010 | Kono | G06F 3/0605 711/E12.019 |
| 2010/0313044 A1 * | 12/2010 | Rajpal | G06F 1/3287 710/33 |
| 2022/0300158 A1 * | 9/2022 | Kushida | G06F 3/0653 |
| 2025/0291396 A1 * | 9/2025 | Samuel | G06F 1/266 |
| 2026/0140566 A1 * | 5/2026 | Lin | G06F 1/3296 |

* cited by examiner

*Primary Examiner* — Than Nguyen
(74) *Attorney, Agent, or Firm* — Joseph Mencher

(57) ABSTRACT

A multi-storage-device logical storage power management system includes a BMC device coupled to storage devices. The BMC device determines power state(s) supported by each of the storage devices and identifies each of the storage devices and each power state supported by that storage device to a user. When the user provides the BMC device a logical storage system instruction to use the storage devices to provide a logical storage system and, for each of the storage devices, a power state selection of one of the power state(s) supported by that storage device, the BMC device uses the storage devices to create the logical storage system based on the logical storage system instruction, and configures each of the storage devices to provide the logical storage system while operating in the power state that was selected via the power state selection received for that storage device.

20 Claims, 18 Drawing Sheets

MULTI-STORAGE-DEVICE LOGICAL STORAGE POWER MANAGEMENT SYSTEM

BACKGROUND

The present disclosure relates generally to information handling systems, and more particularly to managing power used by a logical storage system provided by multiple physical storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes utilize logical storage volumes and/or other logical storage systems to store their data. For example, Hard Disk Drives (HDDs), Solid State Drives (SSDs), and/or other "physical" storage devices may be configured as a "fault tolerant" logical storage volume that provides "mirrored" storage that includes copies of the same data on different physical storage devices, a "concatenated" logical storage volume that combines multiple logical storage volumes into a single logical storage volume, a "striped" logical storage volume in which data is written across multiple physical storage devices to improve Input/Output (IO) performance, a "striped/parity" logical storage volume in which data and parity information are written across three or more physical storage devices so that data can be recovered from any physical storage device if that physical storage device becomes unavailable, and/or other logical storage volumes that would be apparent to one of skill in the art in possession of the present disclosure.

However, the use of logical storage volumes like those described above raises a number of issues. For example, each of the physical storage devices that are used to provide a logical storage volume as discussed above may support a plurality of power states, and the number and details of power states supported by different physical storage devices will often vary, as power states for physical storage devices are not standardized. In many situations it is desirable to provide a power budget for the storage of data by a computing device (e.g., according to sustainability initiatives that direct the management of power consumption to reduce carbon emissions), but the use of a logical storage volume will prevent the ability to do so because the limitations discussed above prevent the accurate retrieval of power consumed by logical storage volumes, the accurate prediction of power consumption by logical storage volumes, the accurate control of power consumption by logical storage volumes, and/or other power management operations that one of skill in the art in possession of the present disclosure will recognize are required to provide and enforce such power budgets.

Accordingly, it would be desirable to provide a logical storage power management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a logical storage power management engine that is configured to: determine at least one power state supported by each of a plurality of storage devices that are coupled to the processing system; identify, to a user via at least one human interface device that is coupled to the processing system, each of the plurality of storage devices and each at least one power state supported by that storage device; receive, from the user via the at least one human interface device, a logical storage system instruction to use the plurality of storage devices to provide a logical storage system and, for each of the plurality of storage devices, a power state selection of one of the at least one power state supported by that storage device; create, using the plurality of storage devices based on the logical storage system instruction, the logical storage system; and configure each of the plurality of storage devices to provide the logical storage system while operating in the one of the at least one power state that was selected via the power state selection received for that storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
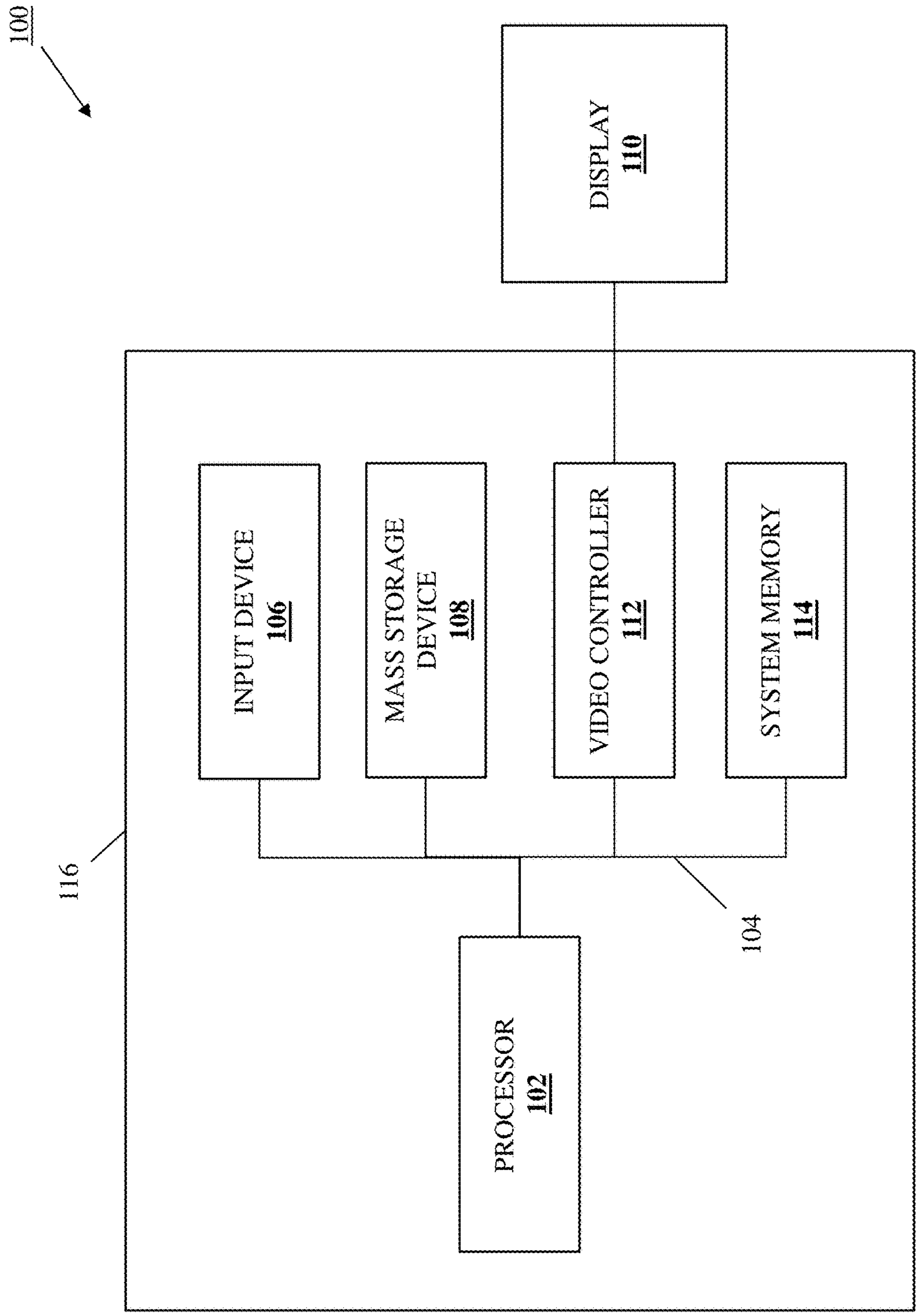
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
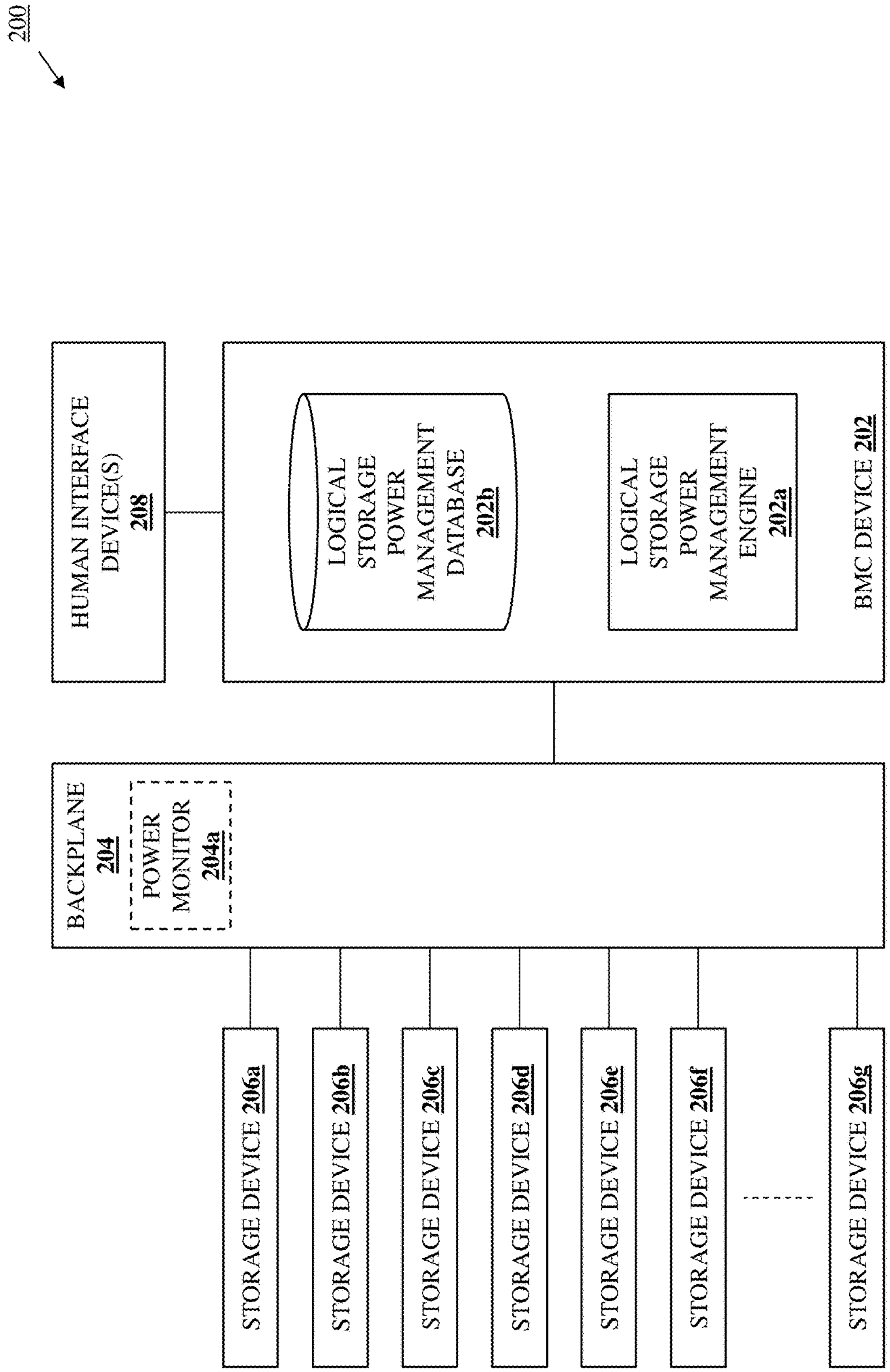
FIG. 2 is a schematic view illustrating an embodiment of a multi-storage-device logical storage power management system provided according to the teachings of the present disclosure.

Referring now to FIG. 2, an embodiment of a multi-storage-device logical storage power management system 200 is illustrated that may be provided according to the teachings of the present disclosure. In the illustrated embodiment, the multi-storage-device logical storage power management system 200 includes a Baseboard Management Controller (BMC) device 202. In an embodiment, the BMC device 202 may be provided by and/or may be included in the IHS 100 discussed above with reference to FIG. 1, and/or may include some or all of the components of the IHS 100. In a specific example, the BMC device 202 may be provided an integrated DELL® Remote Access Controller (iDRAC) available in server devices provided by DELL® Inc. of Round Rock, Texas, United States, although other BMC devices will fall within the scope of the present disclosure as well. However, while the specific examples below include a BMC device that performs the multi-storage-device logical storage power management functionality of the present disclosure, one of skill in the art in possession of the present disclosure will appreciate how the functionality described below as being provided by the BMC device 202 may be provided other devices and/or in a variety of manners that will fall within the scope of the present disclosure as well.

The BMC device 202 may include a processing system (not illustrated, but which may include or be similar to the processor 102 discussed above with reference to FIG. 1) and a memory system (not illustrated, but which may include or be similar to the memory 114 discussed above with reference to FIG. 1) that is coupled to the processing system and that includes instructions that, when executed by the processing system, cause the processing system to provide a logical storage power management engine 202*a* that is configured to perform the functionality of the logical storage power management engines and/or storage controller devices discussed below. The storage controller device 202 may also include a storage system (not illustrated, but which may include or be similar to the storage 108 discussed above with reference to FIG. 1) that is coupled to the logical storage power management engine 202*a* (e.g., via a coupling between the storage system and the processing system) and that includes a logical storage power management database 202*b* that is configured to store any of the information utilized by the logical storage power management engine 202*a* discussed below.

In the embodiments illustrated and described below, the BMC device 202 is coupled via a backplane 204 to a plurality of storage devices 206*a*, 206*b*, 206*c*, 206*d*, 206*e*, 206*f*, and up to 206*g*. To provide a specific example, the backplane 204 and storage devices 206*a*-206*g* may be provided in the chassis of a storage system, while the BMC device 202 may be provided in the chassis of a server device that utilizes the storage system, although one of skill in the art in possession of the present disclosure will appreciate how a variety of configurations that couple the BMC device 202 to the storage devices 206*a*-206*g* will fall within the scope of the present disclosure. As will be appreciated by one of skill in the art in possession of the present disclosure, in the examples below the storage devices 204*a*-204*g* are provided by mass storage devices that are configured to operate in RAID, and thus may be provided by Hard Disk Drive (HDD) storage devices, Solid State Drive (SSD) storage devices (e.g., Non-Volatile Memory express (NVMe) SSD storage devices), "flash" storage devices, and/or other any other mass storage devices that would be apparent to one of skill in the art in possession of the present disclosure. However, while the storage devices 204*a*-204*g* are described as being provided by particular mass storage devices configured for particular storage operations, one of skill in the art in possession of the present disclosure will appreciate how other storage devices will fall within the scope of the present disclosure as well.

Figure 6:
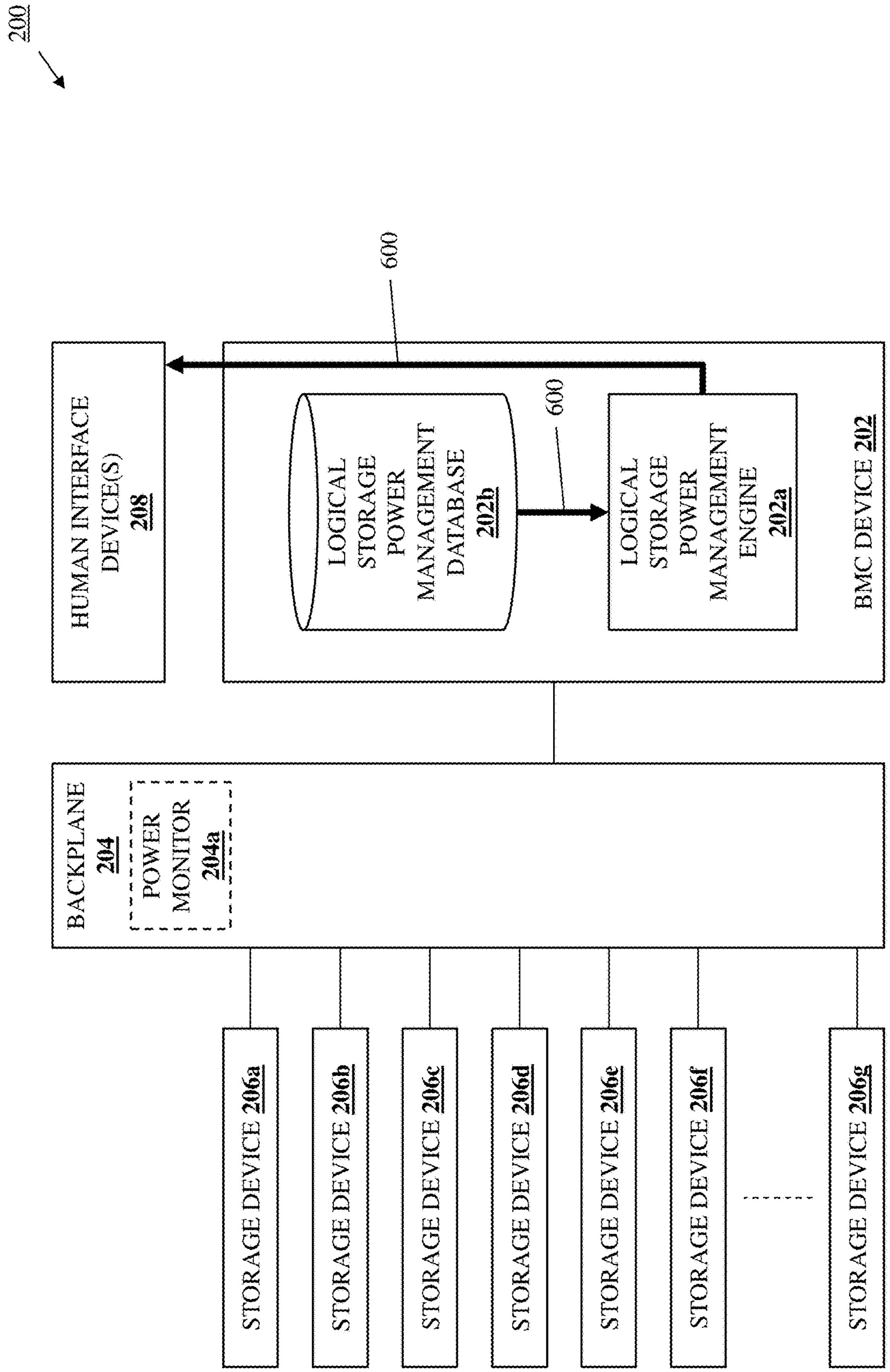
FIG. 6 is a schematic view illustrating an embodiment of the multi-storage-device logical storage power management system of FIG. 2 operating during the method of FIG. 3.

As illustrated in FIG. 6, the backplane 204 may include one or more optional power monitors 204*a*. For example, the power monitor(s) 204*a* may be provided by current monitors in controllers that are included on the backplane and that may be coupled to any of the storage devices 206*a*-206*g*, and one of skill in the art in possession of the present disclosure will appreciate how some of the storage devices 206*a*-206*g* may be coupled to controllers on the backplane that do not include a current monitor while remaining within the scope of the present disclosure as well. As discussed below, the optional power monitor(s) 204*a* may be used to characterize power states supported by the storage devices 206*a*-206*g* connected to them in some of the embodiments of the present disclosure. Furthermore, one of skill in the art in possession of the present disclosure will appreciate how the power monitor(s) 204*a* may be located off the backplane 204 and/or the power monitoring functionality described below may be performed from power monitoring components that may be located elsewhere in the multi-storage device logical storage power management system 200 while remaining within the scope of the present disclosure as well.

In some embodiments, one or more human interface devices 208 may be coupled to the BMC device 202 and, as described below, may be provided by input devices (e.g., mouse devices, keyboard devices, etc.), display devices, Graphical User Interfaces (GUIs), and/or any other human interface devices that would be apparent to one of skill in the art in possession of the present disclosure. However, while a specific multi-storage-device logical storage power management system 200 has been illustrated and described, one of skill in the art in possession of the present disclosure will recognize that the multi-storage-device logical storage power management system (or other devices operating according to the teachings of the present disclosure in a manner similar to that described below for the multi-storage-device logical storage power management system 200) may include a variety of components and/or component configurations for providing conventional storage system functionality, as well as the functionality discussed below, while remaining within the scope of the present disclosure as well.

Figure 3:
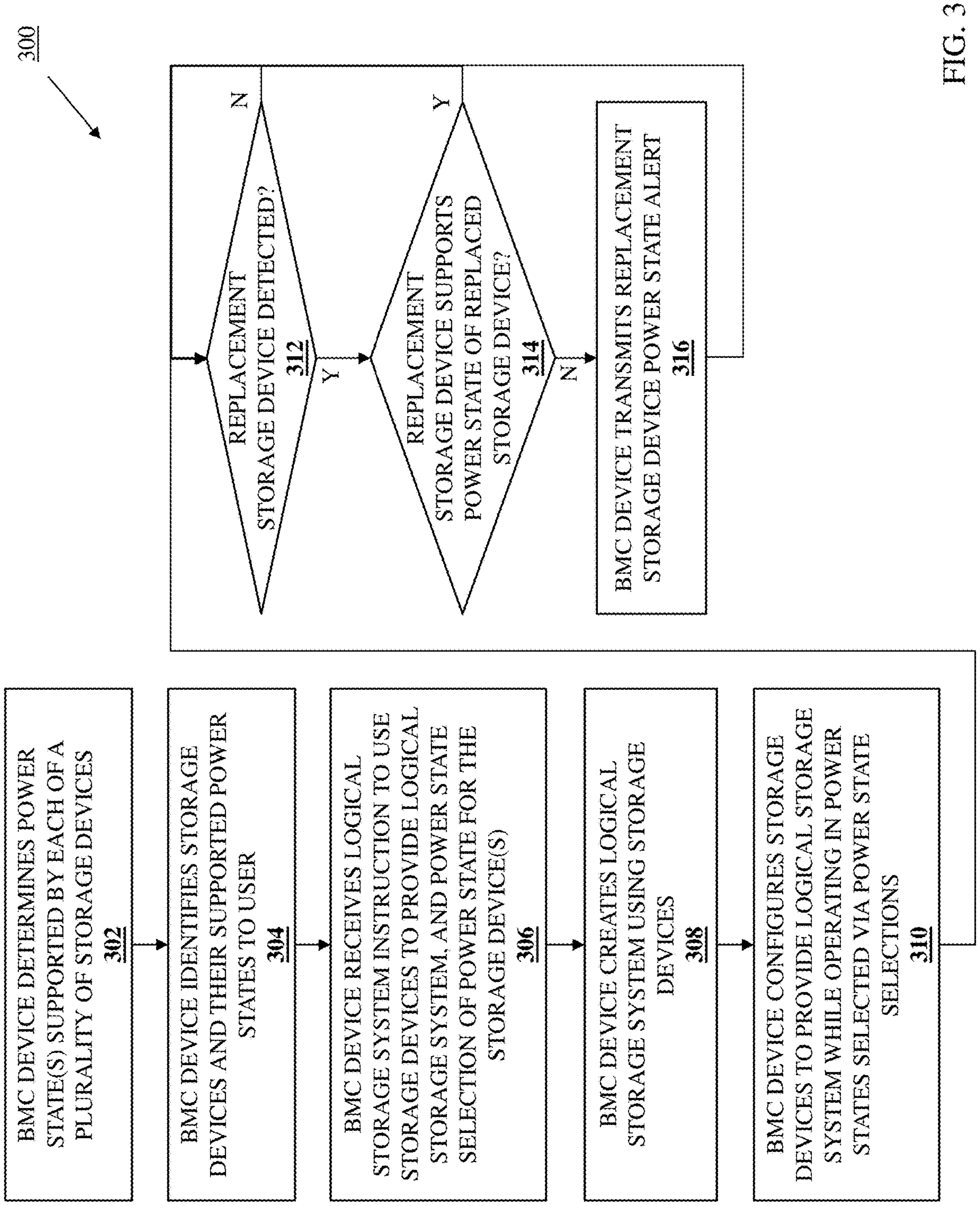
FIG. 3 is a flow chart illustrating an embodiment of a method for managing power for a logical storage system provided by multiple storage devices.

Referring now to FIG. 3, an embodiment of a method 300 for managing power for a logical storage system provided by multiple storage devices is illustrated. As discussed below, the systems and methods of the present disclosure identify power states supported by storage devices that are used to provide a logical storage system to a user and allow a user to select the power states each of those storage devices will operate in while providing the logical storage system. For example, the multi-storage-device logical storage power management system may include a BMC device coupled to storage devices. The BMC device determines power state(s) supported by each of the storage devices and identifies each of the storage devices and each power state supported by that storage device to a user via human interface device(s). When the user uses the human interface device(s) to provide the BMC device a logical storage system instruction to use the storage devices to provide a logical storage system and, for each of the storage devices, a power state selection of one of the power state(s) supported by that storage device, the BMC device uses the storage devices to create the logical storage system based on the logical storage system instruction, and configures each of the storage devices to provide the logical storage system while operating in the power state that was selected via the power state selection received for that storage device. As such, the power consumed by logical storage systems may be managed by a user on a per-storage device basis.

Figure 4:
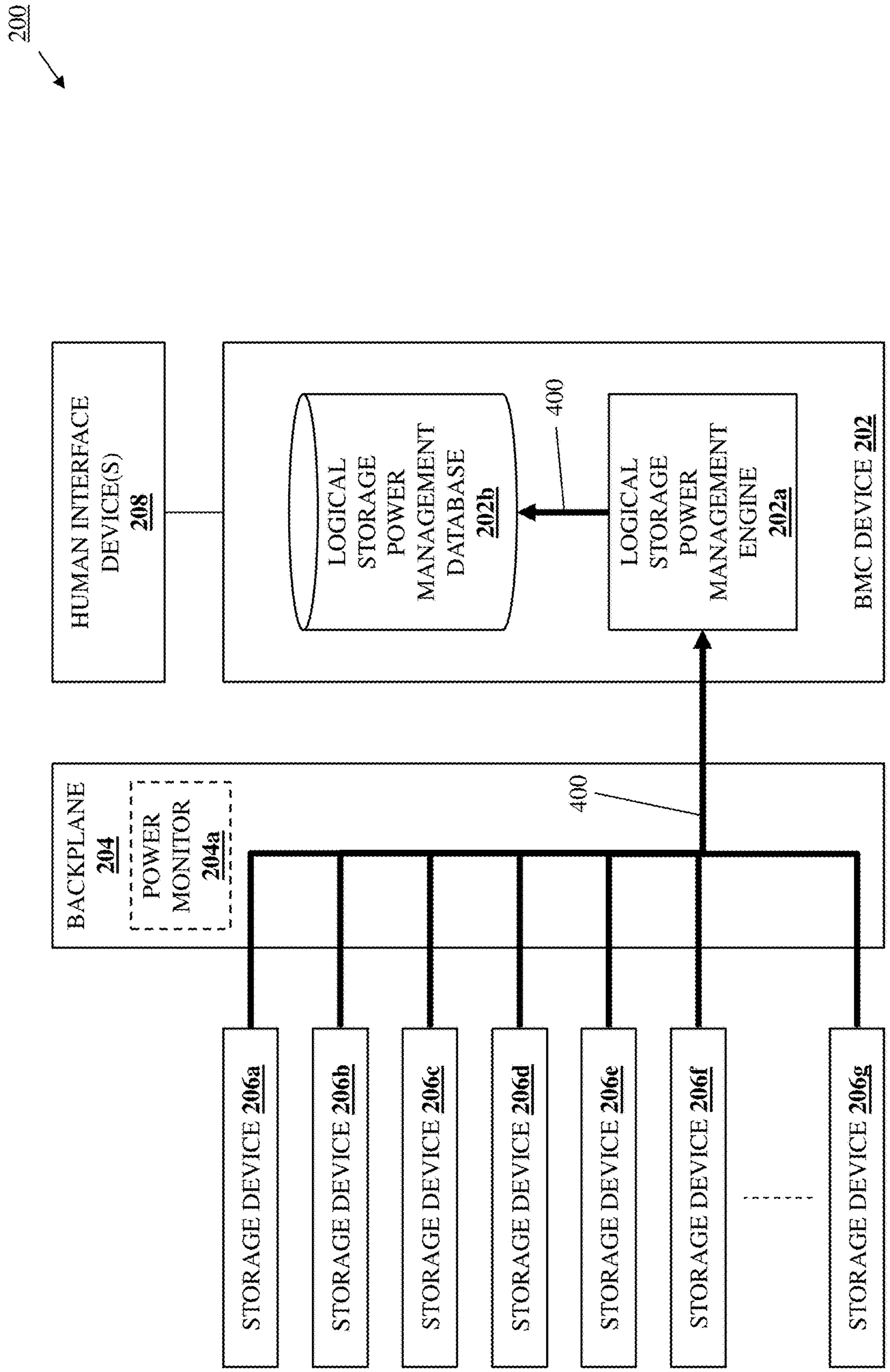
FIG. 4 is a schematic view illustrating an embodiment of the multi-storage-device logical storage power management system of FIG. 2 operating during the method of FIG. 3.

The method 300 begins at block 302 where a BMC device determines at least one power state supported by each of a plurality of storage devices. With reference to FIG. 4, in an embodiment of block 302, the logical storage power management engine 202*a* in the BMC device 202 may perform storage device identification operations 400 that may include identifying each of the storage devices 206*a*-206*g* that are coupled to the backplane 204, retrieving storage device identification information from each of the storage devices 206*a*-206*g*, and storing the storage device identification information in the logical storage power management database 202*b*. In some embodiments the storage device identification information retrieved from the storage devices 206*a*-206*g* may identify those storage devices (e.g., the storage device identification information may include serial numbers or any other unique information that one of skill in the art in possession of the present disclosure would recognize as identifying a storage device), and in some embodiments may also identify characteristics of those storage devices (e.g., a storage slot on the backplane 204 to which those storage devices are couple, a storage protocol used by those storage devices, a media type for those storage devices, a security state for those storage devices, and a storage size for those storage devices in the examples below, as well as any other storage device characteristics that would be apparent to one of skill in the art in possession of the present disclosure).

Furthermore, in some embodiments, the storage device identification information for the storage devices 206*a*-206*g* may include supported power state information for each storage device 206*a*-206*g* that identifies the power states supported by that storage device. For example, any of the storage devices 206*a*-206*g* may store its supported power state information in an Electronically Erasable Read-Only Memory (EEPROM) device or other information storage subsystem included in that storage device, and at block 302 the logical storage power management engine 202*a* may determine the power state(s) supported by any of the storage devices 206*a*-206*g* by retrieving its supported power state information and storing that supported power state information in the logical storage power management database 202*b* in association with its storage device identification information. To provide a specific example, the supported power state information discussed below may identify one or more power operating states of a storage device (e.g., a "P0" operating state, a "P1" operating state, a "P2" operating state, etc.) and, for each of those power operating states, a minimum power $POWER_{MIN}$ and a maximum power $POWER_{MAX}$ that storage device will consume in that power operating state. However, while a specific example of a supported power state information has been described, one of skill in the art in possession of the present disclosure will appreciate how a variety of power state information will fall within the scope of the present disclosure as well.

Furthermore, one of skill in the art in possession of the present disclosure will appreciate how many conventional storage devices do not store their supported power state information as described above or otherwise provide any information about the power states they support. As such, in some examples of block 302 and following the identification of each of the storage devices 206*a*-206*g* as described above, the logical storage power management engine 202*a* in the BMC device 202 may perform supported power state determination operations that include retrieving the power state(s) supported by any of the storage devices 206*a*-206*g* from a database that is accessible to the BMC device 202, and storing supported power state information for that storage device in association with its storage device identification information. For example, the logical storage power management database 202*b* or other BMC-device-accessible storage may be periodically updated with a supported power state catalog that may be compiled by a computing device provider, storage device providers, and/or any other entities that would be apparent to one of skill in the art in possession of the present disclosure, and that identifies storage devices and their supported power states that have been characterized by the computing device provider, storage device providers, and/or any other entities.

Figure 5A:
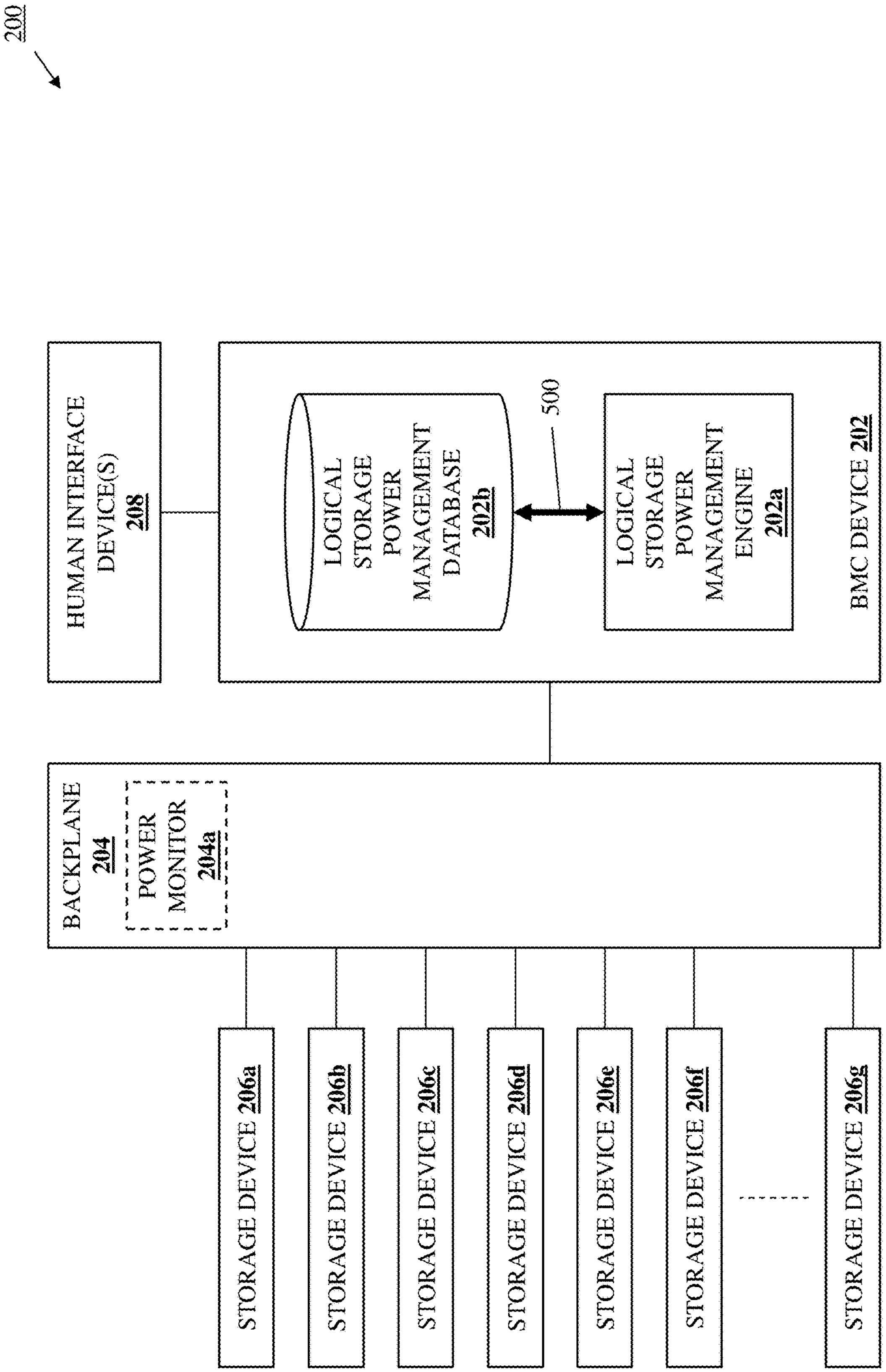
FIG. 5A is a schematic view illustrating an embodiment of the multi-storage-device logical storage power management system of FIG. 2 operating during the method of FIG. 3.

As such, with reference to FIG. 5A and following the identification of the storage device 206*b*, the logical storage power management engine 202*a* may perform supported power state determination operations 500 that include accessing the supported power state catalog in the logical storage power management database 202*b*, retrieving the support power state information for the logical storage device 206*b* (e.g., the power operating state(s) for the storage device 206*b* and the minimum power $POWER_{MIN}$ and a maximum power $POWER_{MAX}$ the storage device 206*b* will consume in each of those power operating states), and storing that supported power state information in association with the storage device identification information in the logical storage power management database 202*b*.

Furthermore, while the supported power state determination operations 502 are described as being performed to determine power states supported by the storage device 206*b*, one of skill in the art in possession of the present disclosure will appreciate how supported power state determination operations 500 may be performed for any of the storage devices 206*a* and 206*c*-206*g* while remaining within the scope of the present disclosure as well. For example, for any of the storage devices 206*a*-206*g* that do not store their supported power state information as described above or otherwise provide any information about the power states they support, the logical storage power management engine 202*a* may perform the supported power state determination operations 500 discussed above for those storage devices.

However, one of skill in the art in possession of the present disclosure will appreciate how the support power state information for some storage devices may not be available in the logical storage power management database (e.g., the supported power state catalog may not include supported power state information for one or more of the storage devices 206*a*-206*g*). As such, in another example of block 302 and following the identification of each of the storage devices 206*a*-206*g* as described above, the logical storage power management engine 202*a* in the BMC device 202 may perform supported power state determination operations that include causing any of the storage devices to operate in a plurality of different storage device operating states, monitoring the power consumed by that storage device during the plurality of different storage device operating states and, based on the monitoring of the power consumed by that storage device during the plurality of different storage device operating states, determining power operating state(s) supported by that storage device and power consumption characteristics of that storage device in each of those power operating state(s), and storing the power operating state(s) and corresponding power consumption characteristics as supported power state information for that storage device in association with its storage device identification information.

Figure 5B:
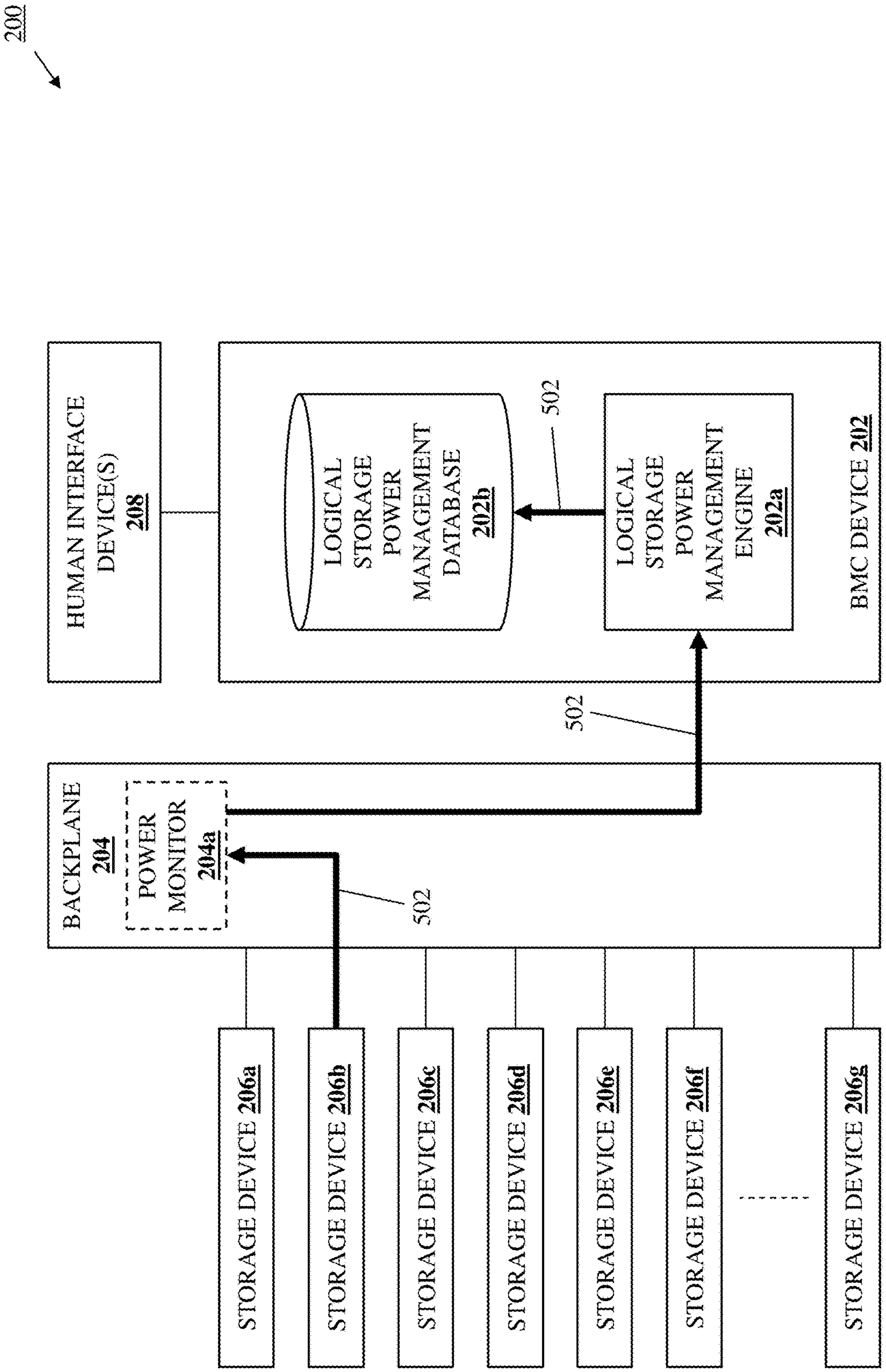
FIG. 5B is a schematic view illustrating an embodiment of the multi-storage-device logical storage power management system of FIG. 2 operating during the method of FIG. 3.

For example, with reference to FIG. 5B, the logical storage power management engine 202*a* in the BMC device 202 is illustrated as performing supported power state determination operations 502 that include the logical storage power management engine 202*a* causing the storage device 206*b* to operate in a plurality of different storage device operating states. As illustrated, the supported power state determination operations 502 also include the power monitor 204*a* on the backplane 204 monitoring the power consumed by the storage device 206*b* during the plurality of different storage device operating states (e.g., a current monitor monitoring current drawn by the storage device 206*b* during the plurality of different storage device operating states) and reporting that consumed power to the logical storage power management engine 202*a*, and the logical storage power management engine 202*a* using the power consumed by the storage device 206*b* in the plurality of different storage device operating states to determine supported power state information for that storage device 206*b* that identifies power operating states (e.g., a "P0" operating state, a "P1" operating state, a "P2" operating state, etc.) and, for each of those power operating states, a minimum power $POWER_{MIN}$ and a maximum power $POWER_{MAX}$ that storage device will consume in that power operating state, and storing the supported power state information for the storage device 206*b* in the logical storage power management database 202*b* in association with the storage device identification information for the storage device 202*b*.

Furthermore, while the supported power state determination operations 502 are described as being performed to determine power states supported by the storage device 206*b*, one of skill in the art in possession of the present disclosure will appreciate how supported power state determination operations 502 may be performed for any of the storage devices 206*a* and 206*c*-206*g* while remaining within the scope of the present disclosure as well. For example, for any of the storage devices 206*a*-206*g* that do not store their supported power state information as described above or otherwise provide any information about the power states they support, and for which no supported power state information is provided in the logical storage power management database 202*b* or other storage accessible to the BMC device 202, the logical storage power management engine 202*a* may determine which of the storage devices 206*a*-206*g* is coupled to a controller on the backplane 204 that provides the optional power monitor 204*a*, and may perform the supported power state determination operations 500 discussed above for those storage devices.

Furthermore, while several specific examples have been provided, one of skill in the art in possession of the present disclosure will appreciate how the supported power state information discussed above may be determined for any of the storage devices 206*a*-206*g* using a variety of techniques that will fall within the scope of the present disclosure. As such, following block 302, the power state(s) supported by the storage devices 206*a*-206*g* may be determined and stored in the logical storage power management database 202*b*.

As will be appreciated by one of skill in the art in possession of the present disclosure, in some embodiments the power state(s) supported by a storage device may not be determinable (e.g., that storage device may not store its supported power state information, no supported power state information for that storage device may be available in the logical storage power management database 202*b*, and that storage device may not be coupled to a controller on the backplane 204 that provides the optional power monitor 204*a*), and in some examples those storage devices with indeterminable supported power states may be excluded from being used to provide the power-managed logical storage system described below. However, while some embodiments of the present disclosure exclude storage devices with indeterminable supported power states from being used to provide the logical storage systems described below, one of skill in the art in possession of the present disclosure will appreciate how the use of storage device(s) with indeterminable supported power states may be allowed in some embodiments of the present disclosure as well (e.g., when sufficient power management of the logical storage system is enabled by managing the power states supported by the other storage devices that are used to provide that logical storage system). Furthermore, in some embodiments the multiple-storage device logical storage power management system of the present disclosure may only operate with storage devices that support at least two power states, and thus single-power-state storage devices or storage devices with indeterminable power states may not be presented to a user for use in providing a power-managed logical storage system as described below.

The method 300 then proceeds to block 304 where the BMC device identifies the storage devices and their supported power states to a user. With reference to FIG. 6, in an embodiment of block 304, the logical storage power management engine 202*a* in the BMC device 202 may perform storage device/supported power state identification operations 600 that include retrieving the storage device identification information identifying the storage devices 206*a*-206*g* and the supported power state information determined for those storage devices 206*a*-206*g* from the logical storage power management database 202*b*, and using it to identify the storage devices 206*a*-206*g* and their supported state(s) to a user via the human interface device(s) 208.

Figure 7A:
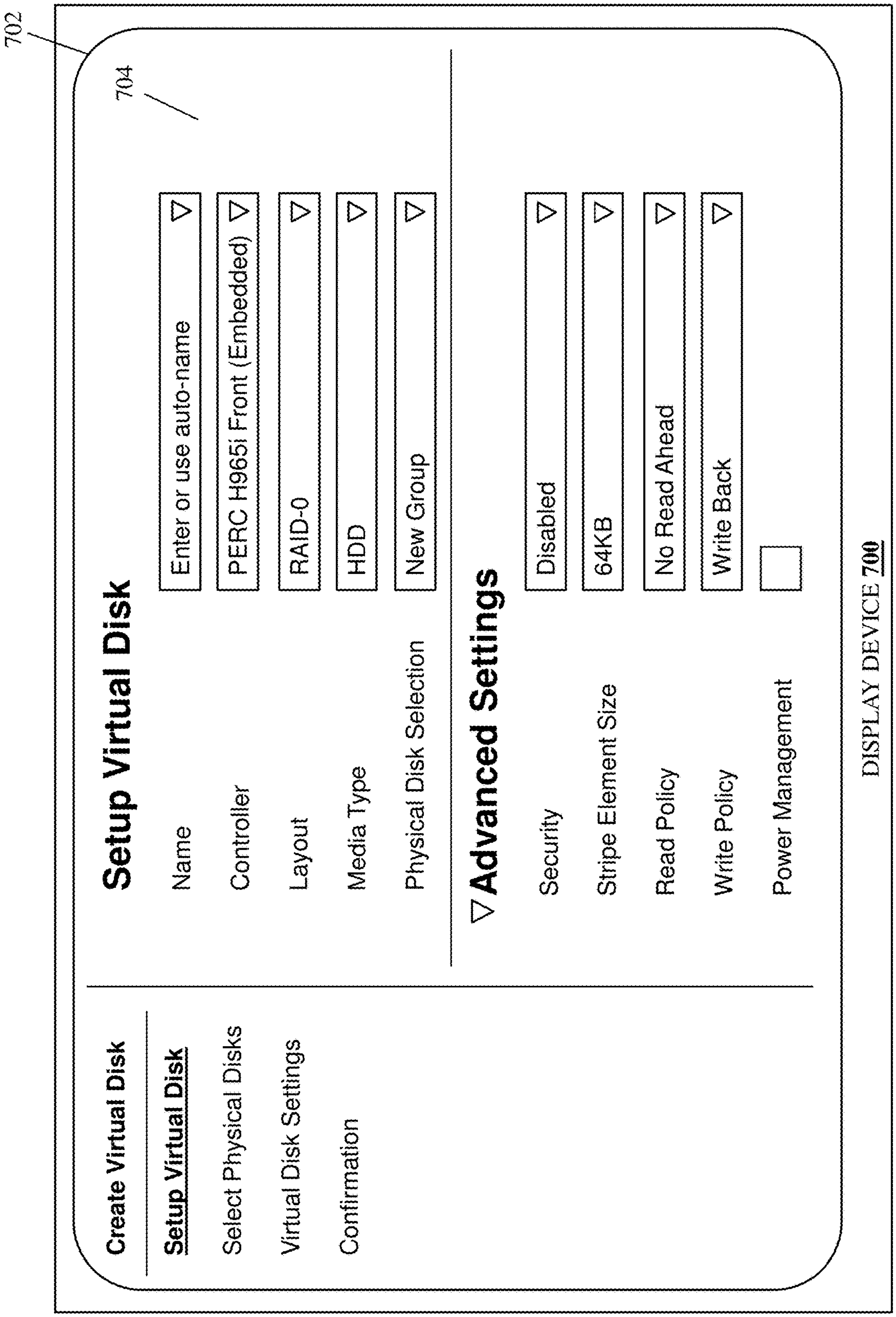
FIG. 7A is a schematic view illustrating an embodiment of a human interface device in the multi-storage-device logical storage power management system of FIG. 2 operating during the method of FIG. 3.

With reference to FIG. 7A, a display device 700 including a display 702 that may provide one of the human interface devices 208 is illustrated, with a logical storage system creation screen 704 provided on the display 702 as part of the storage device/supported power state identification operations 600 by the logical storage power management engine 202*a* at block 304. In the illustrated example, the logical storage system creation screen 704 may be part of a Graphical User Interface (GUI) that enables the setup of a logical storage system (e.g., a "virtual disk") as part of the creation of that logical storage system using the storage devices 206*a*-206*g*, and allows a user to name the logical storage system (or have it "auto-named" using a variety of techniques that would be apparent to one of skill in the art in possession of the present disclosure), identify a controller for the logical storage system (e.g., a "PERC H965i Front (Embedded)" controller in the illustrated example), define a layout of the logical storage system (e.g., a "RAID-0" layout in the illustrated example), select a media type for the logical storage system (e.g., "HDD" in the illustrated example), and identify a physical disk selection for the logical storage system (e.g., "New Group" in the illustrated example). As will be appreciated by one of skill in the art in possession of the present disclosure, each of the logical storage system set up characteristics above are provided via "drop-down" elements that may allow a user to change those logical storage system characteristics as desired.

In the illustrated example, the logical storage system creation screen 704 also provides "Advanced Settings" options that allow a user to set security for the logical storage system ("Disabled" in the illustrated example), identify a stripe element size for the logical storage system (e.g., "64 KB" in the illustrated example), define a read policy for the logical storage system (e.g., "No Read Ahead" in the illustrated example), define a write policy for the logical storage system (e.g., "Write Back" in the illustrated example), and select whether power management will be enabled for the logical storage system (e.g., "New Group" in the illustrated example). As will be appreciated by one of skill in the art in possession of the present disclosure, some of the logical storage system set up characteristics above are provided via "drop-down" elements that may allow a user to change those logical storage system characteristics as desired, with the power management characteristic selectable via a "check box" or other selectable GUI element that would be apparent to one of skill in the art in possession of the present disclosure. Furthermore, while illustrated as not selected in FIG. 7A, one of skill in the art in possession of the present disclosure will appreciate how power management for logical storage systems may be enabled by default (e.g., the "check box" or other selectable GUI element may be "checked" or otherwise "selected" when presented to a user, and must be "unchecked" or otherwise unselected to disable power management of the logical storage system).

Figure 7B:
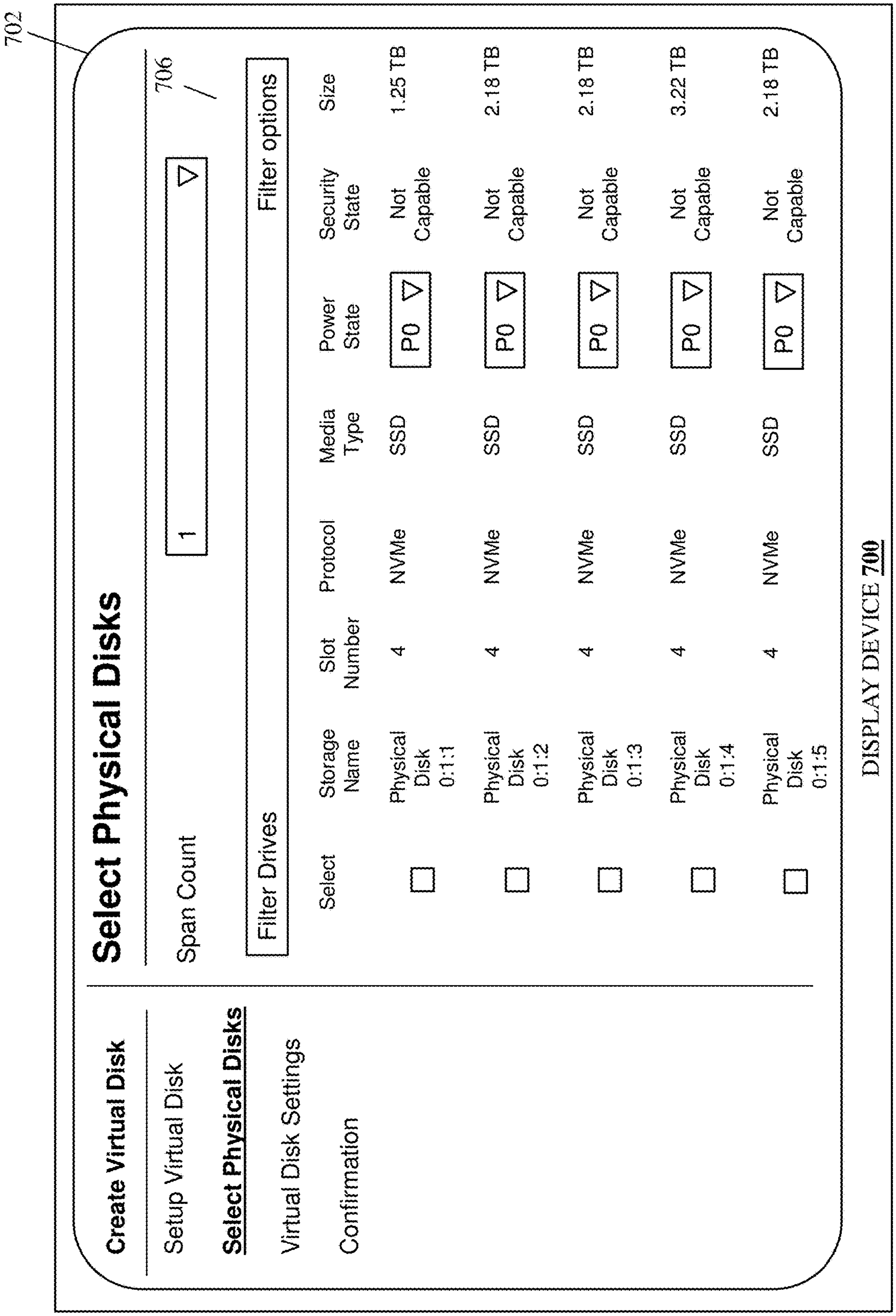
FIG. 7B is a schematic view illustrating an embodiment of a human interface device in the multi-storage-device logical storage power management system of FIG. 2 operating during the method of FIG. 3.

With reference to FIG. 7B, a logical storage system creation screen 706 is illustrated that may be provided on the display 702 as part of the storage device/supported power state identification operations 600 by the logical storage power management engine 202*a* at block 304. In the illustrated example, the logical storage system creation screen 706 may be part of the GUI discussed above that enables the selection of the storage devices 206*a*-206*g* that will provide the logical storage system (e.g., the "virtual disk") as part of the creation of that logical storage system. As can be seen, the logical storage system creation screen 706 provides storage device identification information for a plurality of storage devices that were identified at block 302, which in the illustrated example includes storage device identification information for a first storage device (e.g., a storage name "Physical Disk 0:1:1", a slot number "4", a protocol "NVMe", a media type "SSD", a security state "Not Capable", and a size "1.25 TB"), storage device identification information for a second storage device (e.g., a storage name "Physical Disk 0:1:2", a slot number "4", a protocol "NVMe", a media type "SSD", a security state "Not Capable", and a size "2.18 TB"), storage device identification information for a third storage device (e.g., a storage name "Physical Disk 0:1:3", a slot number "4", a protocol "NVMe", a media type "SSD", a security state "Not Capable", and a size "2.18 TB"), storage device identification information for a fourth storage device (e.g., a storage name "Physical Disk 0:1:4", a slot number "4", a protocol "NVMe", a media type "SSD", a security state "Not Capable", and a size "3.22 TB"), and storage device identification information for a fifth storage device (e.g., a storage name "Physical Disk 0:1:5", a slot number "4", a protocol "NVMe", a media type "SSD", a security state "Not Capable", and a size "2.18 TB").

Furthermore, the logical storage system creation screen 706 also allows a user to set one of the supported power states determined for each of the first storage device, the second storage device, the third storage device, the fourth storage device, and the fifth storage device. As will be appreciated by one of skill in the art in possession of the present disclosure, the logical storage system creation screen 706 allows a user to set one of the supported power states for each storage device via respective "drop-down" elements that allow a user to select a desired supported power state for that storage device. As discussed above, in some embodiments only storage devices that support power states may be identified to a user at block 304, and thus each storage device identified to a user may be accompanied by the identification of the power state(s) supported by that storage device, with storage devices that support multiple power states allowing the selection of one of those power states (e.g., via the "drop down" elements described above), and storage devices that only support a single power state simply identifying that power state and having that power state selected by default (i.e., without the user being able to change that power state). Furthermore, in embodiments in which storage devices that do not support power states are identified to a user at block 304, no power state may be identified for that storage device on the logical storage system creation screen 706.

As illustrated, the logical storage system creation screen 706 also provides a "check box" or other selectable GUI element that would be apparent to one of skill in the art in possession of the present disclosure adjacent the storage device identification information for each of the first storage device, the second storage device, the third storage device, the fourth storage device, and the fifth storage device. As discussed below, the "check box" or other selectable GUI element may be "checked" or otherwise "selected" by a user to identify which of the storage devices to use in providing the logical storage system (e.g., the virtual disk). However, while a specific GUI and specific GUI techniques for identifying storage devices and their supported power states to a user have been illustrated and described, one of skill in the art in possession of the present disclosure will appreciate how storage devices and their supported power states may be identified to a user using a variety of techniques that will fall within the scope of the present disclosure.

Figure 8:
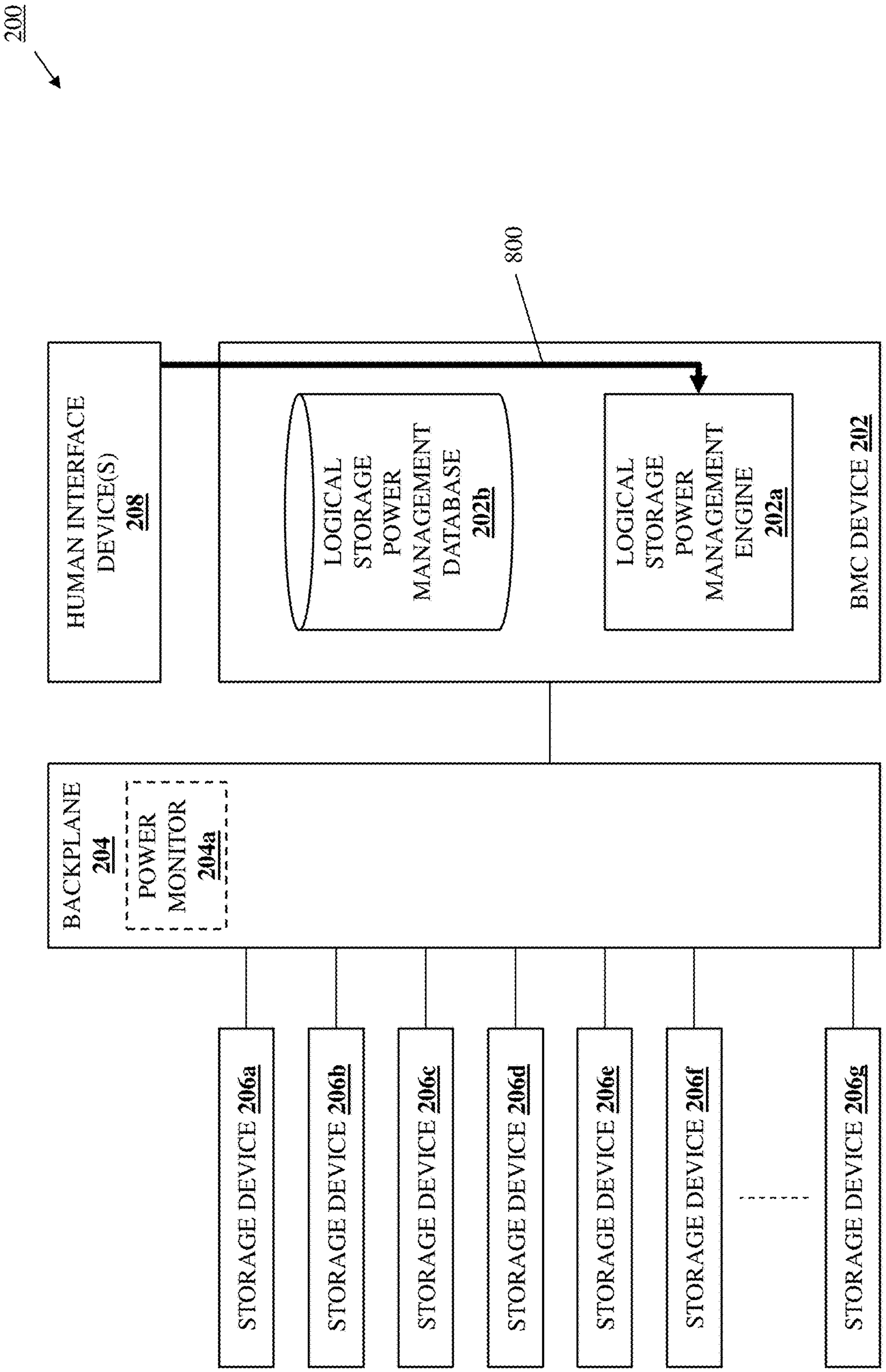
FIG. 8 is a schematic view illustrating an embodiment of the multi-storage-device logical storage power management system of FIG. 2 operating during the method of FIG. 3.
Figure 9A:
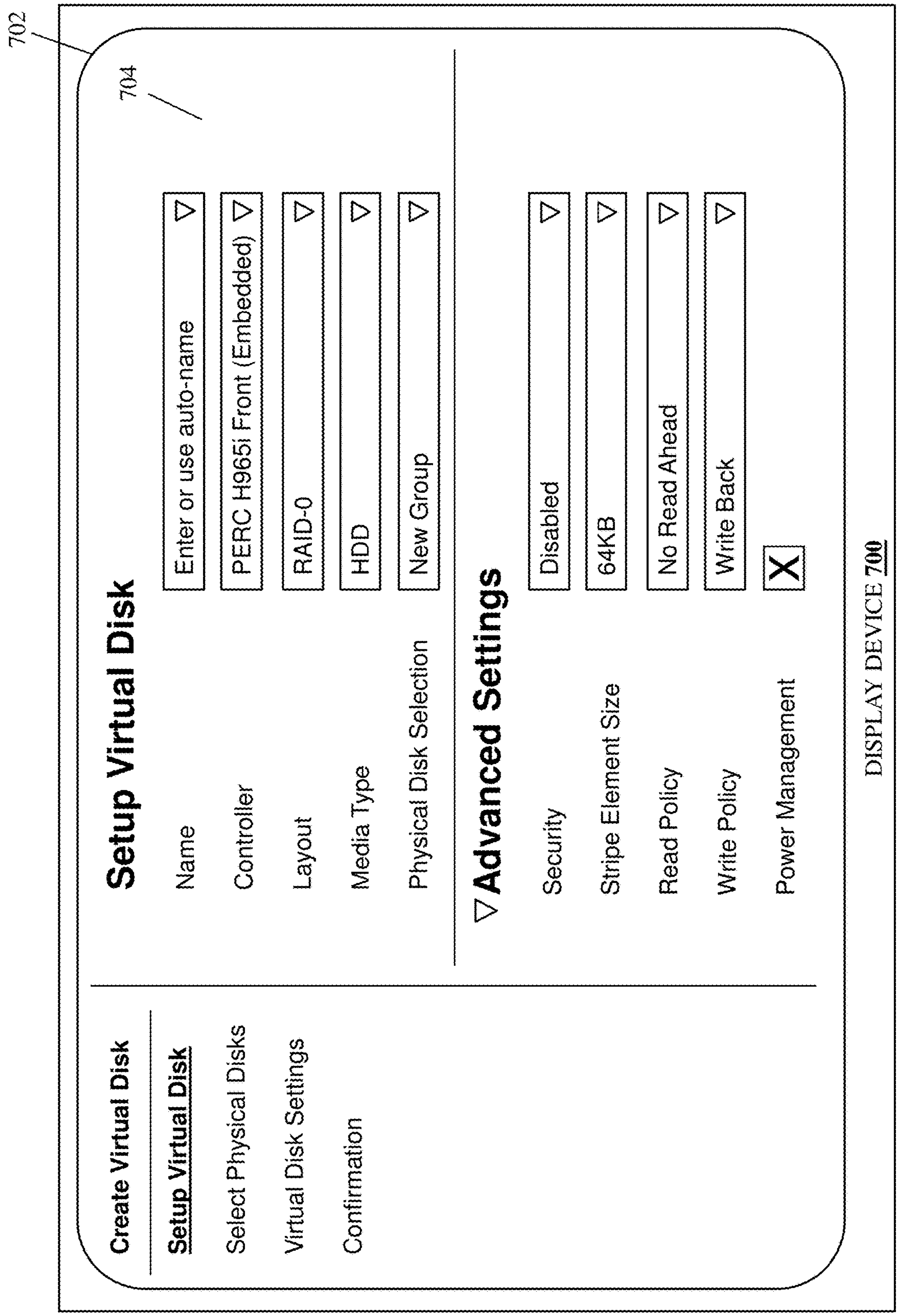
FIG. 9A is a schematic view illustrating an embodiment of a human interface device in the multi-storage-device logical storage power management system of FIG. 2 operating during the method of FIG. 3.

The method 300 then proceeds to block 306 where the BMC device receives a logical storage system instruction to use the storage devices to provide a logical storage system, and a power state selection of a power state for at least some of those storage devices. With reference to FIG. 8, in an embodiment of block 306, a user may utilize the human interface device(s) 208 (e.g., an input device, display device, and GUI discussed above) to perform logical storage system instruction operations 800 that include providing a logical storage system instruction to use the storage device(s) **206*a*-206*g* to provide a logical storage system, and a power state selection of a power states for at least some of those storage devices. For example, with reference to FIG. 9A, at block 306 a user may use the input device to select (or leave selected by default) power management to be enabled for a logical storage system they are created using the logical storage system creation screen 704** (e.g., via the "check box" or other selectable GUI element discussed above).

Figure 9B:
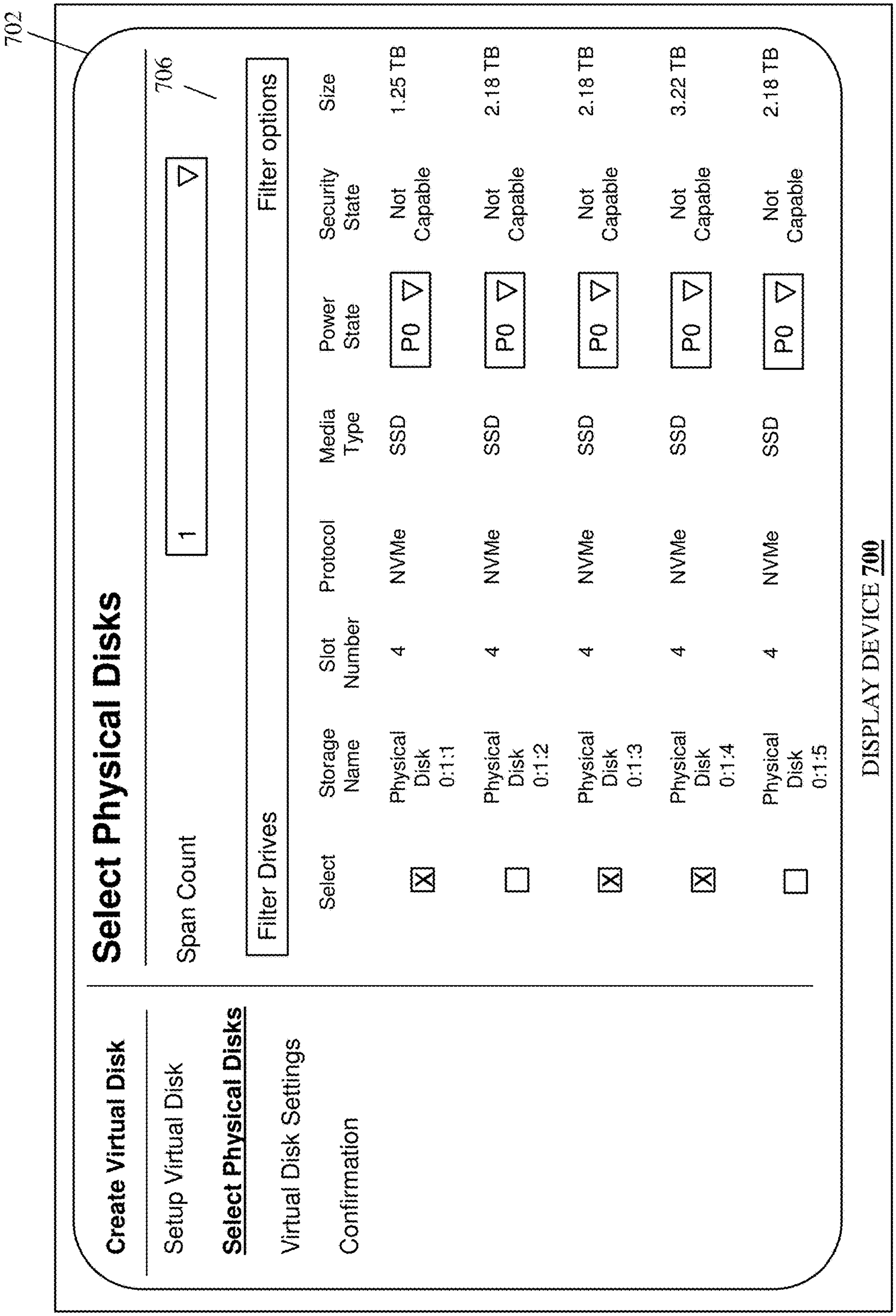
FIG. 9B is a schematic view illustrating an embodiment of a human interface device in the multi-storage-device logical storage power management system of FIG. 2 operating during the method of FIG. 3.
Figure 9C:
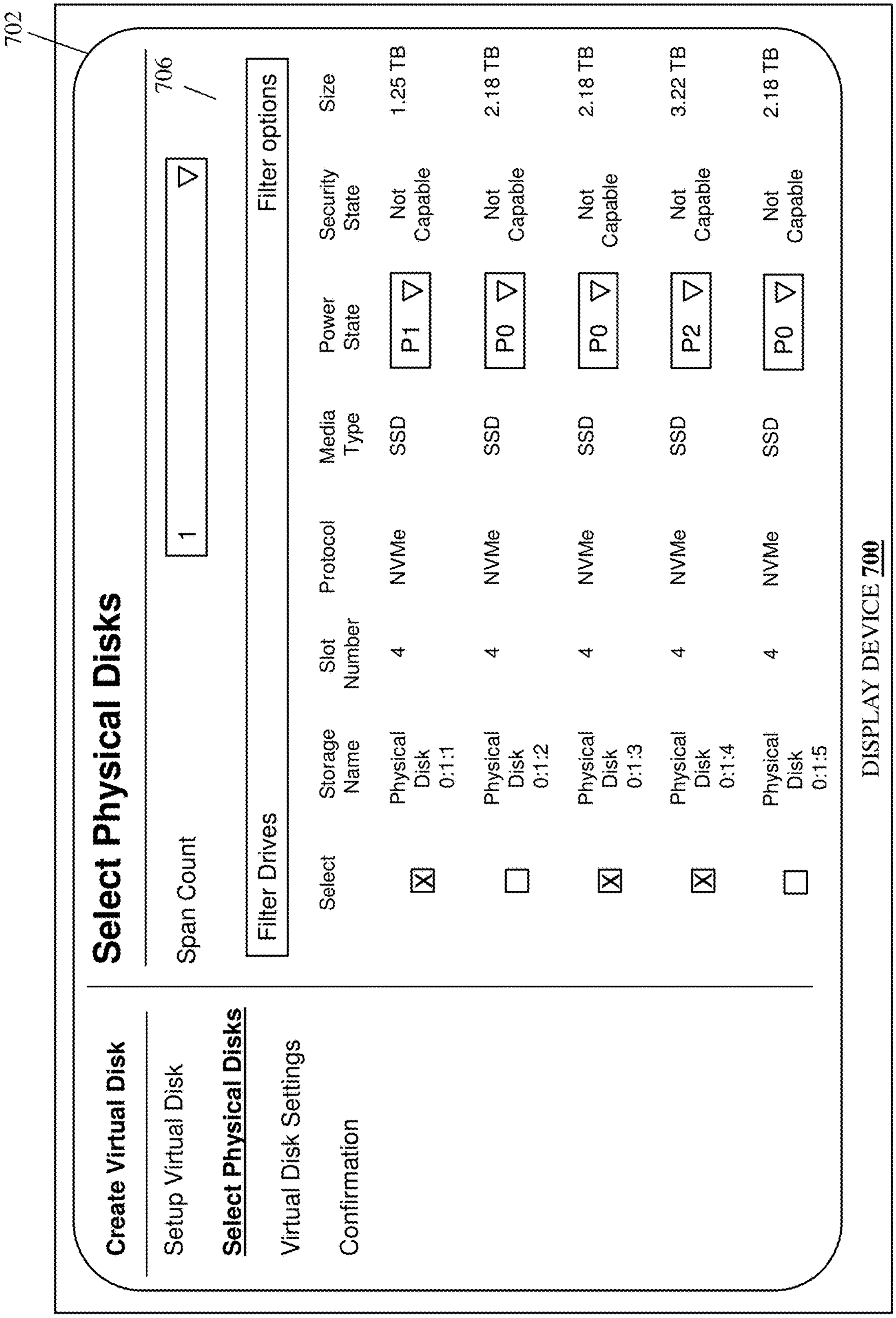
FIG. 9C is a schematic view illustrating an embodiment of a human interface device in the multi-storage-device logical storage power management system of FIG. 2 operating during the method of FIG. 3.

Furthermore, with reference to FIG. 9B, the user may then use the input device to select the first storage device, the third storage device, and the fourth storage device for use in providing the logical storage system on the logical storage system creation screen 706 (e.g., via the "check box" or other selectable GUI element discussed above). Further still, with reference to FIG. 9C, the user may then use the input device to select a power state for the first storage device (e.g., by using the "drop down" element to change the default "P0" power state to a "P1" power state in the illustrated example), use the input device to select a power state for the third storage device (e.g., by not changing the default "P0" power state on the "drop down" element in the illustrated example), and use the input device to select a power state for the fourth storage device (e.g., by using the "drop down" element to change the default "P0" power state to a "P2" power state in the illustrated example) on the logical storage system creation screen 706.

While not illustrated or described in detail, the user may then use the GUI to provide settings for the logical storage system (e.g., via the "Virtual Disk Settings" option that is illustrated on the logical storage system creation screens 704 and 706), confirm the details of the logical storage system (e.g., via the "Confirmation" option that is illustrated on the logical storage system creation screens 704 and 706), and/or otherwise complete creation of the logical storage system using any of a variety of techniques that would be apparent to one of skill in the art in possession of the present disclosure, which may cause the GUI to perform the logical storage system instruction operations 800 discussed above that include providing a logical storage system instruction to use the storage device(s) **206*a*, 206*c*, and 206*d*** to provide a logical storage system in the specific examples provided below, and providing a power state selection of a power state for each of those storage devices.

Figure 10:
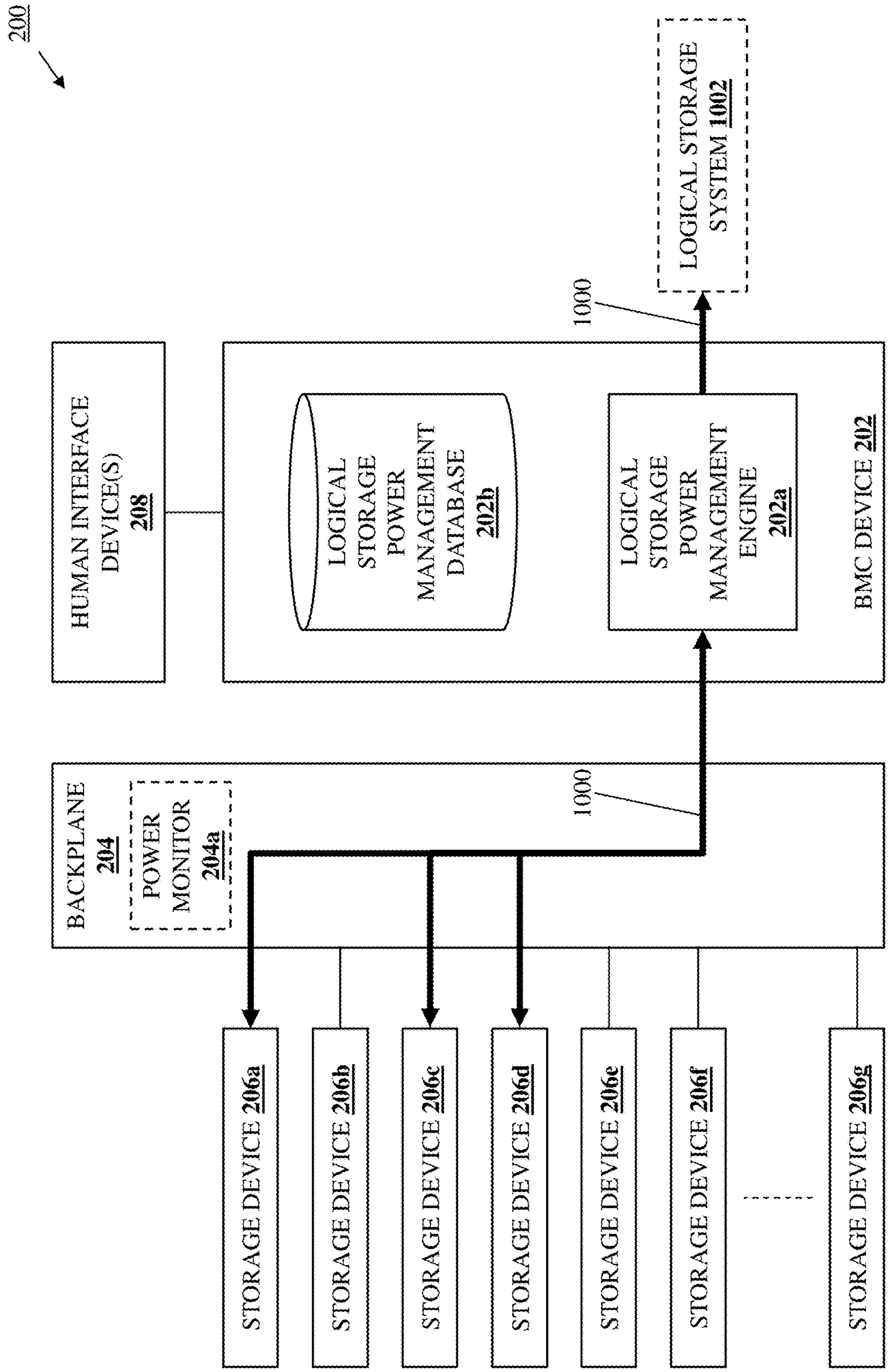
FIG. 10 is a schematic view illustrating an embodiment of the multi-storage-device logical storage power management system of FIG. 2 operating during the method of FIG. 3.

The method 300 then proceeds to block 308 where the BMC device creates the logical storage system using the storage devices. With reference to FIG. 10, in an embodiment of block 308 and in response to receiving the logical storage system instructions and power state selection(s) at block 306, the logical storage power management engine **202*a* in the BMC device 202 may perform logical storage system creation operations 1000 that include configuring the storage devices 206*a*, 206*c*, and 206*d* identified in the logical storage system instructions to provide a logical storage system 1002 using any of a variety of logical storage system configuration techniques known in the art. However, while the storage devices 206*a*, 206*c*, and 206*d* are illustrated and described as being used to provide the logical storage system 1002, one of skill in the art in possession of the present disclosure will appreciate that any number and/or combination of the storage devices 206*a*-206*g*** may be configured to provide a logical storage system while remaining within the scope of the present disclosure.

The method 300 then proceeds to block 310 where the BMC device configures the storage devices to provide the logical storage system while operating in the power states selected via the power state selections. With continued reference to FIG. 10, in an embodiment of block 310, the logical storage system creation operations 1000 performed by the logical storage power management engine 202*a* in the BMC device 202 may may include configuring each of the storage devices 206*a*, 206*c*, and 206*d* to operate in the power state identified in the power state selection received for that storage device when providing the logical storage system 1002. As such, continuing with the specific example above in which the first storage device, the third storage device, and the fourth storage device were selected to provide the logical storage system via the logical storage system creation screen 706, the first storage device may be configured to operate in its "P1" power state while providing the logical storage system, the third storage device may be configured to operate in its "P0" power state while providing the logical storage system, and the fourth storage device may be configured to operate in its "P2" power state while providing the logical storage system. However, while the storage devices 206*a*, 206*c*, and 206*d* are illustrated and described as being used to provide the logical storage system 1002 while operating in particular power states, one of skill in the art in possession of the present disclosure will appreciate that any number and/or combination of the storage devices 206*a*-206*g* may be configured to provide a logical storage system while operating in particular power states while remaining within the scope of the present disclosure.

However, while a plurality of storage devices that support at least one power state have been described as being used to provide the logical storage system 1002, as discussed above, storage devices that support multiple power states may be utilized with storage devices that support a single power state or that have indeterminable power states while remaining within the scope of the present disclosure as well. Thus, following block 310, the storage devices 206*a*, 206*c*, and 206*d* may be utilized to provide the logical storage system 1002, which one of skill in the art in possession of the present disclosure will appreciate may include storing data, being used to retrieve that data, providing data redundancy, and/or any other logical storage system operations that would be apparent to one of skill in the art in possession of the present disclosure.

Figure 11:
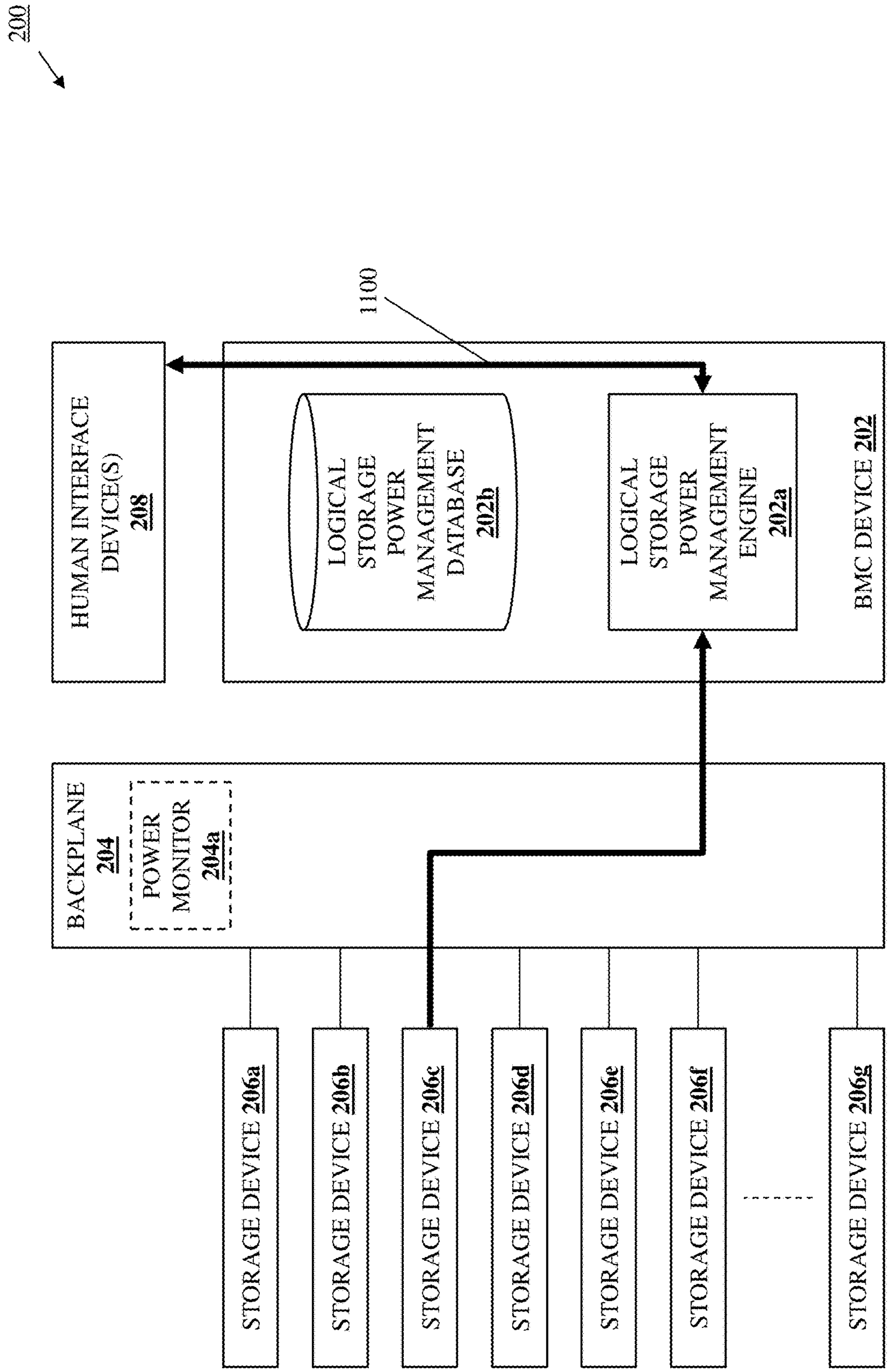
FIG. 11 is a schematic view illustrating an embodiment of the multi-storage-device logical storage power management system of FIG. 2 operating during the method of FIG. 3.

In some embodiments, a user may use the GUI that provided for the creation of the logical storage system 1002 in order to monitor the provisioning of the logical storage system 1002 by the storage devices 206*a*, 206*c*, and 206*d*. For example, with reference to FIG. 11, a user may utilize the human interface device(s) 208 to perform logical storage system provisioning information retrieval operations 1100 that include requesting logical storage system provisioning information from the logical storage power management engine 202*a*, and the logical storage power management engine 202*a* retrieving logical storage system provisioning information from the storage device 206*c* and providing that logical storage system provisioning information to the human interface device(s) 208.

Figure 12:
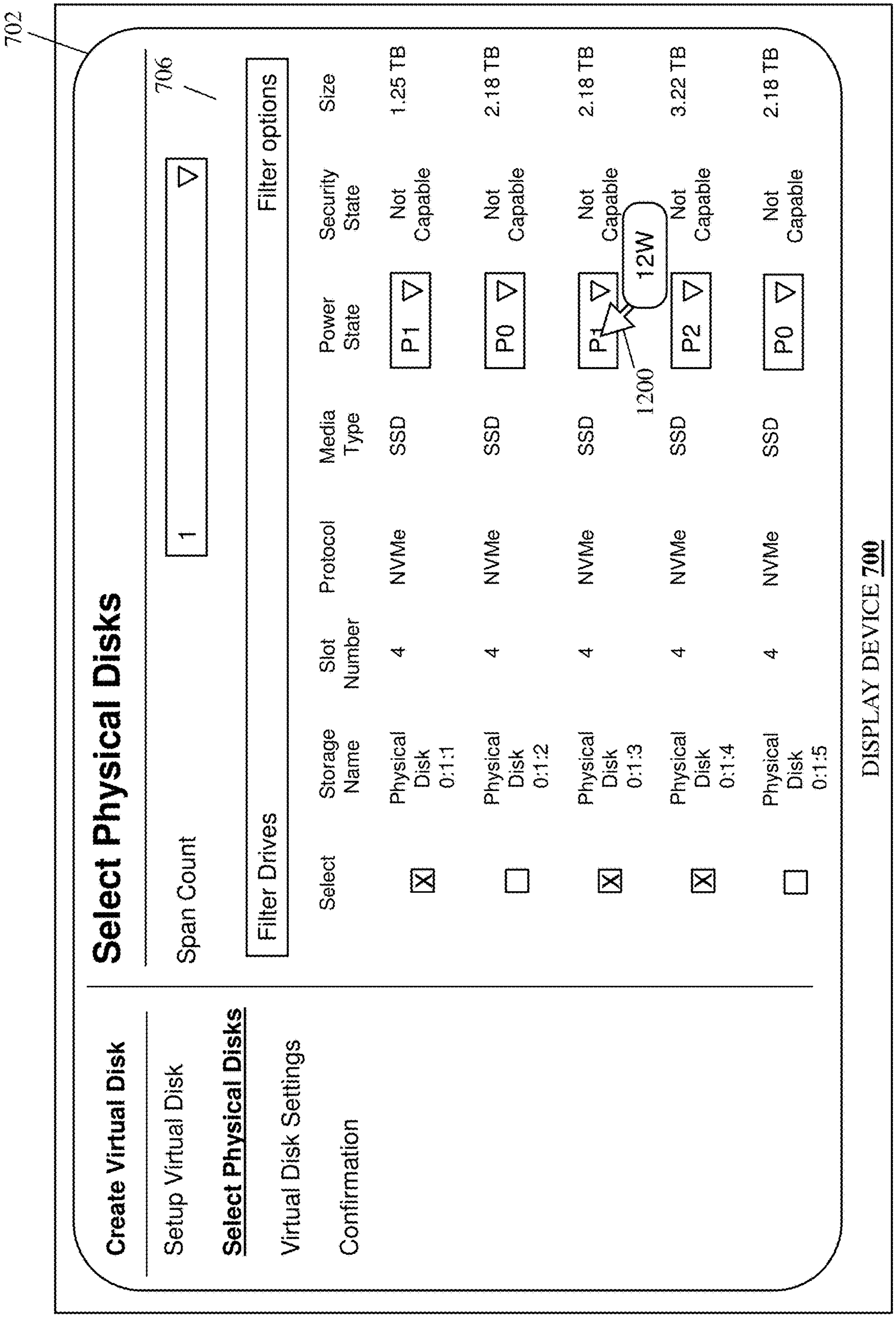
FIG. 12 is a schematic view illustrating an embodiment of a human interface device in the multi-storage-device logical storage power management system of FIG. 2 operating during the method of FIG. 3.

For example, with reference to FIG. 12, a user may position (e.g., "hover") a cursor 1200 over the power state information for the third storage device on the logical storage system creation screen 706 to provide the request for the logical storage system provision information from the logical storage power management engine 202*a* discussed above and, in response, the logical storage power management engine 202*a* may retrieve the current power consumption of the third storage device and provide it for display (e.g., "12 W") adjacent the cursor 1200 to provide the logical storage system provision information for display to the user. However, while a specific example has been provided, one of skill in the art in possession of the present disclosure will appreciate how GUI may be utilized to retrieve a variety of information about the provisioning of the logical storage system 1002 while remaining within the scope of the present disclosure as well.

The method 300 then proceeds to decision block 312 where the method 300 proceeds depending on whether a replacement storage device is detected. As will be appreciated by one of skill in the art in possession of the present disclosure, a storage device being utilized to provide a logical storage system may be replaced for a variety of reasons. For example, a first storage device included in a plurality of storage devices used to provide a RAID system may become unavailable, and that first storage device may be replaced by a replacement storage device that may then be provided with "rebuilt" data that is a copy of the data that was stored on the first storage device using the data stored on the other storage devices. As such, in an embodiment of decision block 306, that logical storage power management engine 202*a* may monitor to determine if any of the storage devices 206*a*, 206*c*, and 206*d* have been replaced. If, at decision block 312, no replacement storage device is detected, the method 300 returns to decision block 312. As such, the method 300 may loop such that the storage devices 206*a*, 206*c*, and 206*d* continue to provide the logical storage system 1002 as long as none of those storage devices is replaced.

Figure 13:
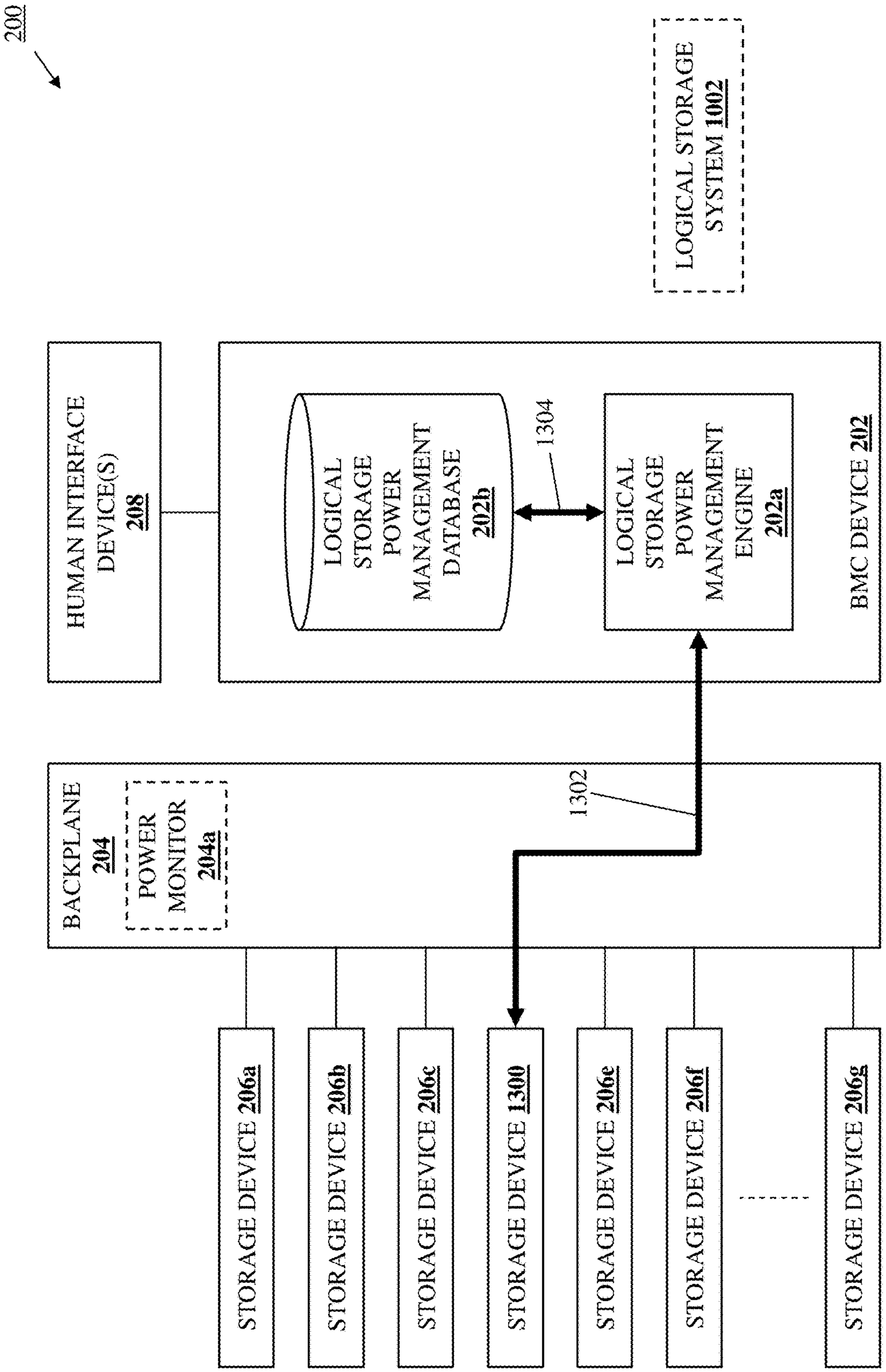
FIG. 13 is a schematic view illustrating an embodiment of the multi-storage-device logical storage power management system of FIG. 2 operating during the method of FIG. 3.

If, at decision block 312, a replacement storage device is detected, the method 300 proceeds to decision block 314 where the method 300 proceeds depending on whether the replacement storage device supports the power state of the replaced storage device. With reference to FIG. 13, in an embodiment of decision block 312, the storage device 206*d* may be replaced by a storage device 1300. In response to the storage device 206*d* being replaced by the storage device 1300 and at decision block 314, the logical storage power management engine 202*a* may perform replacement storage device supported power state determination operations 1302 that include identifying the storage device 1300 and determining power state(s) supported by the storage device 1300, and one of skill in the art in possession of the present disclosure will appreciate how the power state(s) supported by the storage device 1300 may be determined similarly as described above with reference to block 302 (e.g., by retrieving the supported power states from the storage device 1300, by identifying the supported power states for the storage device 1300 in the logical storage power management database 202*b*, or by characterizing the power states supported by the storage device 1300). The logical storage power management engine 202*a* may then perform replaced storage device power state support determination operations 1304 that include accessing the logical storage power management database 202*b* and determining whether any of the supported power states for the storage device 1300 match the power state in which the storage device 206*d* was operating to provide the logical storage system 1002 prior to its replacement.

If, at decision block 314, the replacement storage device supports the power state of the replaced storage device, the method 300 returns to decision block 312. As such, in the event the storage device 1300 supports the power state in which the storage device 206*d* was operating to provide the logical storage system 1002 prior to its replacement, the storage device 1300 may be used to provide the logical storage system 1002 similarly as the storage device 206*d* while operating in that power state. Thus, the method 300 may loop such that logical storage system continues to be provided by storage devices including a replacement storage device if that replacement storage device supports the power state that was being operated in by the storage device it replaced.

Figure 14:
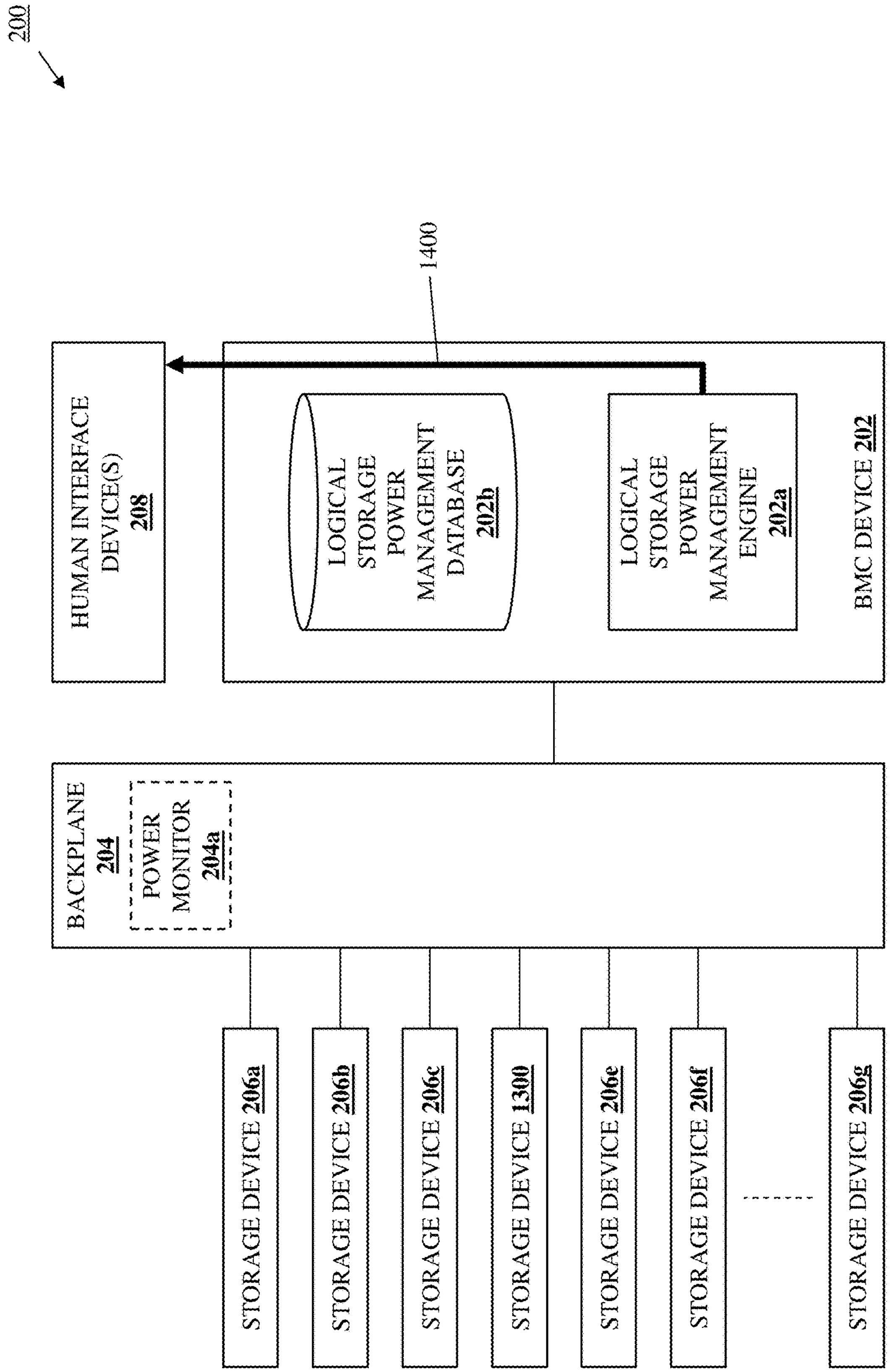
FIG. 14 is a schematic view illustrating an embodiment of the multi-storage-device logical storage power management system of FIG. 2 operating during the method of FIG. 3.

If, at decision block 314, the replacement storage device does not support the power state of the replaced storage device, the method 300 proceeds to block 316 where the BMC device transmits a replacement storage device power state alert. With reference to FIG. 14, in an embodiment of block 316 and in response to determining that the storage device 1300 does not support the power state in which the storage device 206*d* was operating to provide the logical storage system 1002 prior to its replacement, the logical storage power management engine 202*a* may perform replacement storage device power state alert transmission operations 1400 that include transmitting a replacement storage device power state alert to the human interface device(s) 208 (e.g., via the GUI on the display device 700 discussed above) to inform the user that the storage device 206*d* has been replaced with the storage device 1300 that does not support the power state in which the storage device 206*d* was operating. As such, one of skill in the art in possession of the present disclosure will appreciate how a user receiving the replacement storage device power state alert may modify the power state of replacement storage devices to a desirable power state (if available), or may replace that replacement storage device with a replacement storage device that supports a desired power state.

The method 300 then returns to decision block 312. As such, the method 300 may loop such that users are alerted to when storage devices that provide the logical storage system are replaced with replacement storage devices that do not support the power state that was being operated in by the storage device it replaced.

Thus, systems and methods have been described that identify power states supported by storage devices used to provide a logical storage system to a user and allow a user to select the power states each of those storage devices will operate in while providing the logical storage system. For example, the multi-storage-device logical storage power management system may include a BMC device coupled to storage devices. The BMC device determines power state(s) supported by each of the storage devices and identifies each of the storage devices and each power state supported by that storage device to a user via human interface device(s). When the user uses the human interface device(s) to provide the BMC device a logical storage system instruction to use the storage devices to provide a logical storage system and, for each of the storage devices, a power state selection of one of the power state(s) supported by that storage device, the BMC device uses the storage devices to create the logical storage system, and configures each of the storage devices to provide the logical storage system while operating in the power state that was selected via the power state selection received for that storage device. As such, the power consumed by logical storage systems may be managed by a user on a per-storage device basis.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-storage-device logical storage power management system, comprising:

a plurality of storage devices; and a Baseboard Management Controller (BMC) device that is coupled to the plurality of storage devices and that is configured to:

determine at least one power state supported by each of the plurality of storage devices;

identify, to a user via at least one human interface device, each of the plurality of storage devices and each at least one power state supported by that storage device;

receive, from the user via the at least one human interface device, a logical storage system instruction to use the plurality of storage devices to provide a logical storage system and, for each of the plurality of storage devices, a power state selection of one of the at least one power state supported by that storage device;

create, using the plurality of storage devices based on the logical storage system instruction, the logical storage system; and configure each of the plurality of storage devices to provide the logical storage system while operating in the one of the at least one power state that was selected via the power state selection received for that storage device.

2. The system of claim 1, wherein each of the plurality of storage devices supports a plurality of power states.

3. The system of claim 1, wherein the BMC device is configured to determine each at least one power state supported by at least one of the plurality of storage devices by:

causing that storage device to operate in a plurality of different storage device operating states;

monitoring the power consumed by that storage device during the plurality of different storage device operating states; and determining, based on the monitoring of the power consumed by that storage device during the plurality of different storage device operating states, the at least one power state supported by that storage device.

4. The system of claim 1, wherein the BMC device is configured to determine each at least one power state supported by at least one of the plurality of storage devices by:

retrieving, from a database that is accessible to the BMC device, the at least one power state supported by that storage device.

5. The system of claim 1, wherein the BMC device is configured to:

detect, following the creation of the logical storage system, that a first storage device included in the plurality of storage devices has been replaced by a replacement storage device;

determine that the replacement storage device does not support the one of the at least one power state that the first storage device was configured to operate in; and transmit, to the user via the at least one human interface device in response to determining that the replacement storage device does not support the one of the at least one power state that the first storage device was configured to operate in, a replacement storage device power state alert.

6. The system of claim 1, wherein at least two of the plurality of storage devices are configured to operate in different power states when providing the logical storage system.

7. An Information Handling System (IHS), comprising:
- a processing system; and
- a memory system that is coupled to the processing system and that includes instructions that, when executed by the processing system, cause the processing system to provide a logical storage power management engine that is configured to:
  - determine at least one power state supported by each of a plurality of storage devices that are coupled to the processing system;
  - identify, to a user via at least one human interface device that is coupled to the processing system, each of the plurality of storage devices and each at least one power state supported by that storage device;
  - receive, from the user via the at least one human interface device, a logical storage system instruction to use the plurality of storage devices to provide a logical storage system and, for each of the plurality of storage devices, a power state selection of one of the at least one power state supported by that storage device;
  - create, using the plurality of storage devices based on the logical storage system instruction, the logical storage system; and
  - configure each of the plurality of storage devices to provide the logical storage system while operating in the one of the at least one power state that was selected via the power state selection received for that storage device.

8. The IHS of claim 7, wherein each of the plurality of storage devices supports a plurality of power states.

9. The IHS of claim 7, wherein the logical storage power management engine is configured to determine each at least one power state supported by at least one of the plurality of storage devices by:
- causing that storage device to operate in a plurality of different storage device operating states;
- monitoring the power consumed by that storage device during the plurality of different storage device operating states; and
- determining, based on the monitoring of the power consumed by that storage device during the plurality of different storage device operating states, the at least one power state supported by that storage device.

10. The IHS of claim 7, wherein the logical storage power management engine is configured to determine each at least one power state supported by at least one of the plurality of storage devices by:
- retrieving, from a database that is accessible to the BMC device, the at least one power state supported by that storage device.

11. The IHS of claim 7, wherein the logical storage power management engine is configured to:
- detect, following the creation of the logical storage system, that a first storage device included in the plurality of storage devices has been replaced by a replacement storage device;
- determine that the replacement storage device does not support the one of the at least one power state that the first storage device was configured to operate in; and
- transmit, to the user via the at least one human interface device in response to determining that the replacement storage device does not support the one of the at least one power state that the first storage device was configured to operate in, a replacement storage device power state alert.

12. The IHS of claim 7, wherein at least two of the plurality of storage devices are configured to operate in different power states when providing the logical storage system.

13. The IHS of claim 7, wherein the logical storage power management engine is configured to:
- receive, from the user via the at least one human interface and subsequent to configuring each of the plurality of storage devices to provide the logical storage system while operating in the one of the at least one power state that was selected via the power state selection received for that storage device, an identification of a first storage device included in the plurality of storage devices;
- determine a power amount being consumed by the first storage device while providing the logical storage system; and
- identifying, to the user via the at least one human interface, the power being consumed by the first storage device while providing the logical storage system.

14. A method for managing power for a logical storage system provided by multiple storage devices, comprising:
- determining, by a Baseboard Management Controller (BMC) device, at least one power state supported by each of a plurality of storage devices;
- identifying, by the BMC device to a user via at least one human interface device, each of the plurality of storage devices and each at least one power state supported by that storage device;
- receiving, by the BMC device from the user via the at least one human interface device, a logical storage system instruction to use the plurality of storage devices to provide a logical storage system and, for each of the plurality of storage devices, a power state selection of one of the at least one power state supported by that storage device;
- creating, by the BMC device using the plurality of storage devices based on the logical storage system instruction, the logical storage system; and
- configuring, by the BMC device, each of the plurality of storage devices to provide the logical storage system while operating in the one of the at least one power state that was selected via the power state selection received for that storage device.

15. The method of claim 14, wherein each of the plurality of storage devices supports a plurality of power states.

16. The method of claim 14, wherein the determining each at least one power state supported by at least one of the plurality of storage devices includes:
- causing that storage device to operate in a plurality of different storage device operating states;
- monitoring the power consumed by that storage device during the plurality of different storage device operating states; and
- determining, based on the monitoring of the power consumed by that storage device during the plurality of different storage device operating states, the at least one power state supported by that storage device.

17. The method of claim 14, wherein the determining each at least one power state supported by at least one of the plurality of storage devices includes:
- retrieving, from a database that is accessible to the BMC device, the at least one power state supported by that storage device.

18. The method of claim 14, further comprising:

detecting, by the BMC device following the creation of the logical storage system, that a first storage device included in the plurality of storage devices has been replaced by a replacement storage device;

determining, by the BMC device, that the replacement storage device does not support the one of the at least one power state that the first storage device was configured to operate in; and transmitting, by the BMC device to the user via the at least one human interface device in response to determining that the replacement storage device does not support the one of the at least one power state that the first storage device was configured to operate in, a replacement storage device power state alert.

19. The method of claim 14, wherein at least two of the plurality of storage devices are configured to operate in different power states when providing the logical storage system.

20. The method of claim 14, further comprising:

receiving, by the BMC device from the user via the at least one human interface and subsequent to configuring each of the plurality of storage devices to provide the logical storage system while operating in the one of the at least one power state that was selected via the power state selection received for that storage device, an identification of a first storage device included in the plurality of storage devices;

determining, by the BMC device, a power amount being consumed by the first storage device while providing the logical storage system; and identifying, by the BMC device to the user via the at least one human interface, the power being consumed by the first storage device while providing the logical storage system.

* * * * *